United States Patent [19]
Baror

[11] Patent Number: 6,014,728
[45] Date of Patent: *Jan. 11, 2000

[54] ORGANIZATION OF AN INTEGRATED CACHE UNIT FOR FLEXIBLE USAGE IN SUPPORTING MULTIPROCESSOR OPERATIONS

[75] Inventor: Gigy Baror, Austin, Tex.

[73] Assignee: Advanced Micro Devices, Inc., Sunnyvale, Calif.

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/785,389

[22] Filed: Jan. 21, 1997

Related U.S. Application Data

[62] Division of application No. 08/434,494, May 4, 1995, Pat. No. 5,627,992, which is a continuation of application No. 07/559,550, Jul. 23, 1990, abandoned, which is a continuation of application No. 07/146,076, Jan. 20, 1988, abandoned.

[51] Int. Cl.[7] .................................................. G06F 12/00
[52] U.S. Cl. ...................... 711/133; 711/134; 711/142; 711/143; 711/144; 711/145; 711/206
[58] Field of Search ................... 395/460, 461, 395/469, 470; 711/133, 134, 142, 143, 144, 145, 206

[56] References Cited

U.S. PATENT DOCUMENTS

| | | | |
|---|---|---|---|
| 3,761,833 | 9/1973 | Alvarez et al. | 331/45 |
| 3,898,624 | 8/1975 | Tobias | 711/118 |
| 4,156,906 | 5/1979 | Ryan | 711/128 |
| 4,157,586 | 6/1979 | Gannon et al. | 711/142 |
| 4,228,503 | 10/1980 | Waite et al. | 711/121 |
| 4,357,656 | 11/1982 | Saltz et al. | 711/138 |
| 4,394,731 | 7/1983 | Flusche et al. | 711/145 |
| 4,400,770 | 8/1983 | Chan et al. | 711/3 |
| 4,423,483 | 12/1983 | Tague et al. | 395/898 |
| 4,435,759 | 3/1984 | Baum et al. | 711/118 |
| 4,437,149 | 3/1984 | Pomerene et al. | 395/389 |
| 4,438,490 | 3/1984 | Wilder, Jr. | 711/145 |
| 4,442,487 | 4/1984 | Fletcher et al. | 711/122 |
| 4,445,174 | 4/1984 | Fletcher | 711/121 |
| 4,455,606 | 6/1984 | Cushing et al. | 711/121 |
| 4,464,717 | 8/1984 | Keeley et al. | 711/122 |
| 4,471,429 | 9/1984 | Porter et al. | 711/144 |
| 4,471,430 | 9/1984 | Bowden et al. | 711/144 |
| 4,493,026 | 1/1985 | Olnowich | 711/128 |
| 5,025,366 | 6/1991 | Baror | 395/461 |
| 5,627,992 | 5/1997 | Baror | 711/133 |

*Primary Examiner*—Tuan V. Thai
*Attorney, Agent, or Firm*—Conley, Rose & Tayon, PC; B. Noel Kivlin

[57] ABSTRACT

A computer system having a cache memory subsystem which allows flexible setting of caching policies on a page basis and a line basis. A cache block status field is provided for each cache block to indicate the cache block's state, such as shared or exclusive. The cache block status field controls whether the cache control unit operates in a write-through write mode or in a copy-back write mode when a write hit access to the block occurs. The cache block status field may be updated by either a TLB write policy field contained within a translation look-aside buffer entry which corresponds to the page of the access, or by a second input independent of the TLB entry which may be provided from the system on a line basis.

7 Claims, 4 Drawing Sheets

ORGANIZATION OF AN INTEGRATED CACHE UNIT FOR FLEXIBLE USAGE IN SUPPORTING MULTIPROCESSOR OPERATIONS

This is a Division of application Ser. No. 08/434,494 filed May 4, 1995 is now U.S. Pat. No. 5,627,992, which in turn is a Continuation of application Ser. No. 07/559,550 filed Jul. 23, 1990, now abandoned, which is a continuation application of Ser. No. 07/146,076, filed Jan. 20, 1988, now abandoned.

BACKGROUND OF THE INVENTION

1. Field of the Invention

The invention relates generally to methods and apparatus for organizing cache units and more particularly relates to methods and apparatus for organizing an integrated cache unit which may be used to implement a variety of multiprocessor support schemes in a flexible manner. The resulting cache unit is programmable, can be operated in both single and multiprocessor modes, and achieves cache data consistency in multiprocessor mode by allowing a plurality of user selectable multiprocessor support schemes to be implemented and tailored to cache system application. The novel system supports high speed instruction and data processing in a Reduced Instruction Set Computer (RISC) environment and is capable of supporting all of the aforesaid functions with an architecture suitable for integration on a single chip.

2. Description of the Related Art

Cache memories and controllers for cache memories are well known. Devices integrating both the memory and control features on a single chip are also known. These include the commercially available 43608 manufactured by NEC. Such devices are hereinafter referred to as "Integrated Cache Units (ICUs).

Prior art ICU devices utilize predetermined algorithms for caching data and instructions i.e., the devices are not programmable. Heretofore, integrating cache memory, a cache controller and programmability features on a single chip has not been achieved due in part to circuit density and data path requirement. In addition to not being programmable, no known ICU architecture has overcome the circuit density and data path requirement problems associated with supporting high speed RISC systems having multiprocessor capabilities.

A programmable integrated cache unit would be desirable since it would have the inherent flexibility to permit the selection and/or modification of caching algorithms. Additionally, a programmable ICU which incorporates a plurality of user selectable multiprocessor support schemes would allow cache data consistency to be assured in a flexible manner.

A single chip ICU architecture with the aforementioned features would also be desirable to minimize space and unit power requirements. Still further, it would be desirable to be able to use such an integrated cache unit to support high speed processing operations in both single and multiprocessor modes, for both RISC and non-RISC environments.

SUMMARY OF THE INVENTION

Methods and apparatus are disclosed for realizing an integrated cache unit which may be used to flexibly implement a plurality of multiprocessor support schemes. The preferred embodiment of the invention comprises both a cache memory and a cache controller on a single chip, is programmable and includes the other aforementioned desirable features.

The flexible implementation of a plurality of multiprocessor support schemes in the cache system is achieved, according to the preferred embodiment of the invention, via methods and apparatus which allow the user to specify a desired multiprocessor support scheme through the setting of appropriate option bits in on-chip special registers. This can be performed under software control and allows a high performance multiprocessor cache system to be designed with few parts, at low cost and with the ability to perform with high efficiency.

The preferred embodiment of the invention is described in the context of an integrated cache unit (ICU) which includes 8k bytes of data, 512-20 bit words of tags, and the necessary control to fully implement cache functions in both RISC and non-RISC environments. The preferred embodiment of the ICU has two buses, one for the processor interface and the other for a memory interface. An exemplary processor and high speed interface supported by the ICU is described in copending application Ser. No. 012,226 filed Feb. 9, 1987, assigned to the same assignee as the instant invention, hereby incorporated by reference.

For the purposes of this disclosure, the processor bus is a non-multiplexed 32 bit address and data bus. The processor bus supports burst and pipeline accesses as taught in the copending application. Additionally, for the purposes of this disclosure, the memory bus provides the interface to main memory and accommodates multiprocessor organizations.

According to the preferred embodiment of the invention, the ICU is capable of operating at frequencies in excess of 25 megahertz, achieving processor access times of two cycles for the first access in a sequence, and one cycle for burst-mode or pipelined accesses. It can be used as either an instruciton cache or data cache with flexible internal cache organization. A RISC processor and two ICUs (for instruction cache and data cache) implements a very high performance processor with 16k bytes of cache. Larger caches can be designed by using additonal ICUs.

It is an object of the invention to provide methods and apparatus for realizing a programmable cache unit which has enough inherent flexibility to support a wide variety of user specified multiprocessor support schemes, while imposing only minimal restrictions on the multiprocessor system organization.

It is a further object of the invention to provide an ICU architecture including means for choosing from a plurality of multiprocessor support schemes to assure cache data consistency.

It is still a further object of the invention to provide methods and apparatus for realizing a programmable integrated cache unit suitable for supporting high speed data and instruction processing applications, in a multiprocessing system, in both RISC and non-RISC architecture environments.

It is yet another object of the invention to realize the aforementioned objectives with a cache architecture which can be integrated on a single chip.

The disclosed ICU can be used as either a data cache or instruction cache.

Further features include flexible and extensive multiprocessor support hardware, modularity, low power requirements, etc. A combination of bus watching, ownership schemes, software control and hardware control are also used to achieve cache consistency.

These and other objects and features of the present invention will become apparent to those skilled in the art upon consideration of the following detailed description and the accompanying Drawing, in which like reference designations represent like features throughout the figures.

DETAILED DESCRIPTION

Figure 1:
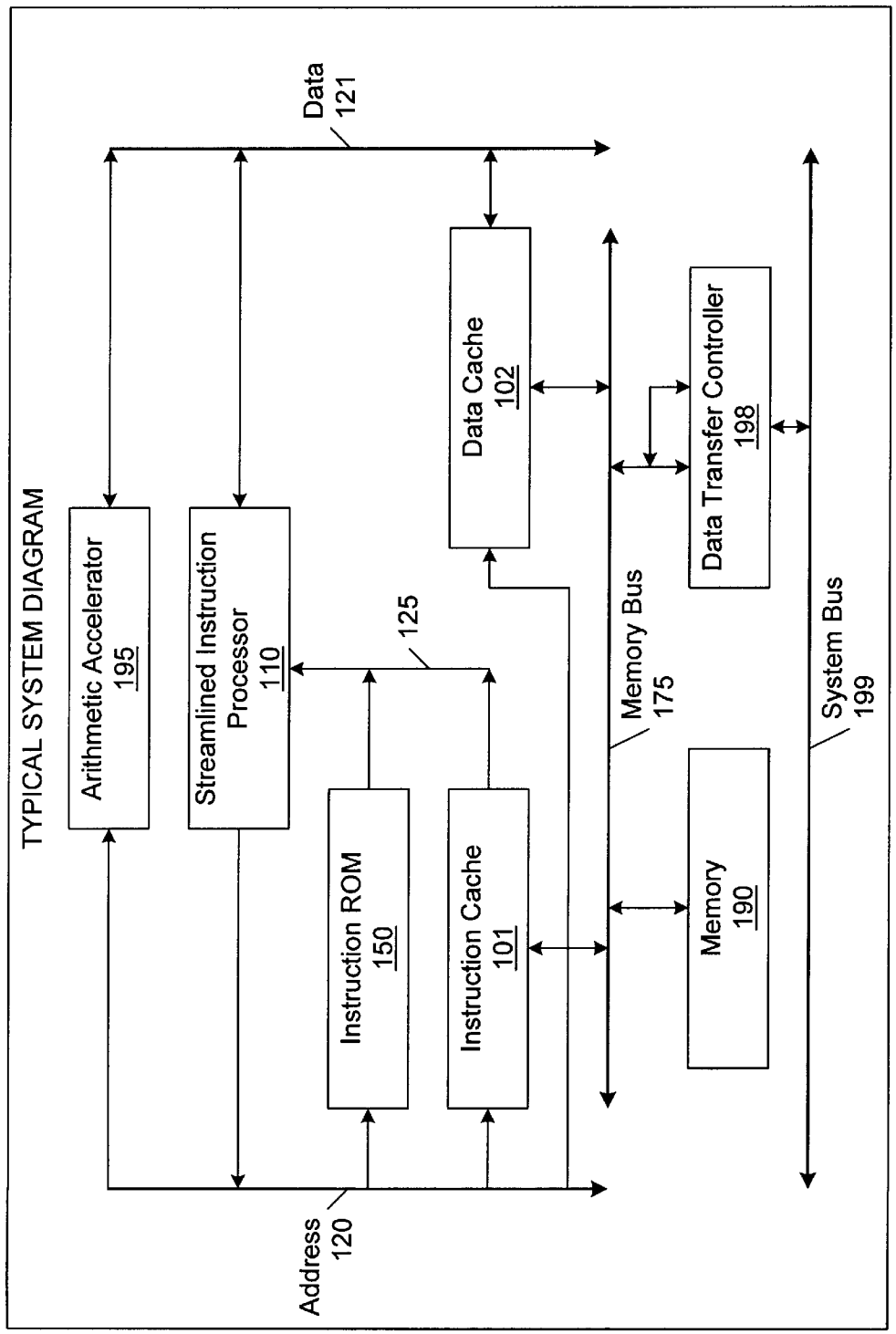
FIG. 1 depicts, in block diagram form, a computing system that includes two of the novel ICUs.

FIG. 1 depicts a typical computing system configuration that would include the novel ICU.

For the sake of illustration only, the invention will be described in the context of a RISC processing system having both single and multiprocessor modes of operation. It will be clear to those skilled in the art that the ICU, to b e described in detail hereinafter, may be used in non-RISC environments as well.

FIG. 1 depicts two of the new ICUs. ICU 101 is shown being used as an instruction cache, while ICU 102 is show n being used as a data cache.

An example of the depicted, and suitable, high speed interface coupling the RISC streamlined instruction processor (SIP) to the caches is described in detail in the copending application Ser. No. 012,226 previously incorporated herein by reference.

The incorporated application also teaches the various operating modes of the SIP, processor inputs and outputs, etc. which will be referenced herein and will be shown as supported by the novel ICU.

FIG. 1 goes on to show the processor bus comprised of Address Bus 120 and Data Bus 121. Instructions in Instruction ROM 150 and the instruction cache, ICU 101, are addressed by processor 110 via Address Bus 120. Instructions fetched are shown transmitted to processor 110 via bus 125.

The data cache, ICU 102, is also addressed via Address Bus 120. Bidirectional data flow is shown possible between processor 110 and ICU 102 via Data Bus 121.

Memory Bus 175 is shown as the bus coupling main memory 190 with ICU 101 and ICU 102. For the sake of completeness, arithmetic accelerator 195, which would be part of a typical RISC system configuration, is shown coupled to buses 120 and 121. Also, Data Transfer Controllers (DTCs) shown as DTC 198, may be used as part of a typical system configuration to, for example, allow commercially available peripheral devices having speeds much lower then the high speed processor, to be attached to the system without limiting the performance of the processor, cache units, etc.

A typical arithmetic accelerator is described in copending application Ser. No. 771,385, filed Aug. 30, 1985, also assigned to the same assignee as the instant invention.

Before proceeding with the detailed description, the novel integrated cache architecture is described hereinafter using general cache terms and multiprocessor cache terms which themselves need to be defined first for the sake of clarity. The general cache terms used herein are defined as follows:

Block—A cache block is a group of sequential words associated with a tag. A cache block is allocated and replaced as a group whenever required. In the preferred embodiment of the ICU the block size is four words (one tag per four words).

Block status—Status bits which are associated with a cache block. According to the preferred embodiment of the ICU, there are two status bits per block. They specify the modified and shared status of a block.

Block status array—An on chip random access memory array that contains the block status bits.

Copy-back—A write policy in which a write access is performed only in the cache, for the case of hit. The block which includes the written data is marked as modified. The data is written (copied back) to the main memory only when the modified block is replaced.

Data cache—A cache which is used for caching frequently used processor data variables.

Direct-mapped—This is an alternate term for a one-way set-associative organization. A specific address can be cached only in one specific location (directly mapped by the address) in the cache.

Hit—The word specified by the access address is present in the cache memory array. An address match is found in the tag array, and the corresponding valid bit is set.

Invalidate—An operation that removes valid data from the cache. One or more valid bits are reset, so that the corresponding words become invalid.

Instruction cache—A cache which is used for caching frequently used processor instructions.

Least recently used (LRU)—A replacement algorithm in which the block to be replaced is chosen according to the history of its usage. The least recently used block is replaced.

Lock in cache—Data variables or instructions can be locked in the cache. They will not be replaced even if they are chosen by the replacement algorithm. Note that the *LOCK input to the ICU, to be described hereinafter, specifies interlock operations, and it is not used for lock in cache operations. A lock bit is associated with each block to facilitate locking the block.

Memory array—On chip random access memory array that contains the cached data or instructions.

Memory bus—The bus that connects the cache to the main memory.

Miss—The word specified by the access address is not present in the cache memory array.

Modified block—A block is marked as modified when it is written in a copy-back write policy. This indicates that the block is modified relative to the main memory, and contains the more recent version of the data.

Non-cacheable—An instruction or data variable which cannot be cached. A non-cacheable operation is transferred by the ICU to the memory bus. The cache is not searched for it, and no cache block is allocated.

Prefetch—The operation of fetching data variables or instructions into the cache before they are requested.

Prefetch buffer—A buffer which holds prefetched data variables or instructions read from the memory bus, before they are written into the cache. In the ICU the read buffer is used for the function of a prefetch buffer.

Preload—A special prefetch operation that loads the cache with specific data variables or instructions. The addresses for the preload operation are specified by the user as opposed to other prefetch operations in which the prefetched addresses are determined by the cache.

Processor bus—The bus that connects the cache to the processor.

Random replacement—A replacement algorithm in which the block to be replaced is chosen randomly.

Read buffer—A buffer which holds data variables or instructions read from the memory bus, before they are written into the cache. In the preferred embodiment of the ICU the read buffer is four words deep, and it is also used for the function of a prefetch buffer.

Read-through—In the case of a cache miss, the required data or instruction is transferred to the processor as soon as it is accepted from the memory. The reload operation is completed in parallel. In a cache with no read-through, the reload operation is completed before the required data or instruction is transferred to the processor.

Reload—The operation that is performed in the case of cache miss for fetching the required data or instructions from the main memory.

Replacement algorithm—The algorithm that determines the block to be replaced when a new block is allocated in the cache. One block from the set that contains the required new address is chosen.

Scope—This term is used in the context of cache instruction to define the scope of the instruction effect. The instruction can affect one specific ICU, multiple instruction caches, multiple data caches, or multiple instruction and data caches.

Set—A group of tags and the associated cache blocks, which are read and compared concurrently to the requested address. A match can be found to any of the set's tags. The set is specified according to some of the address bits. The number of tags in the set is equal to the number of "ways", (to be defined hereinafter), in the cache organization.

Set-associative—A cache organization which allows caching of a specific address in a number of possible locations in the cache. This number is referred to as the degree of associativity. It specifies the number of "ways" in the cache organization and the number of tags which are read and compared concurrently. The disclosed ICU supports two-way and one-way set-associative organizations.

Sub-block—A group of one or more words which are fetched from main memory together with the required word for the reload operation. The sub-block size defines the maximum number of words that are fetched. The sub-block size is lower or equal to the block size.

Tag—The tag identifies the address of the data or instruction which is currently present in the cache. A cache tag is associated with each cache block, and it is stored in the tag array. In the preferred embodiment of the ICU each tag corresponds to a four-word block.

Tag array—On chip random access memory array that contains the address tags for the cached data or instructions.

Update memory—An operation that causes the update of the main memory from the cache. A modified block is written by the cache to the main memory so that the memory is updated with the most current version of the data.

Valid array—On chip random access memory array that contains the valid bits.

Valid bit—A bit that indicates the validity of the cached data. In the preferred embodiment of the ICU a valid bit is associated with each cached word.

Way—A group of tags associated with a tag array module. Only one tag specified by the module's address decoder is read and compared from each way. In the preferred embodiment of the ICU there are two ways, each containing 256 tags.

Write-allocate—In case of cache miss for write operation, a cache block is allocated for the block that contains the written address. A reload operation is performed for the required block. For non-write-allocate, a cache block is not allocated, and the write is performed only in the memory.

Write buffer—A buffer which holds write accesses information (address, data, and control) until the write access is performed on the memory bus. The preferred embodiment of the ICU includes a four deep write buffer that can hold up to four write accesses.

Write-through—A write policy in which every write access is performed into the main memory. In the case of cache hit, the data is also written into the cache.

The multiprocessor cache terms used herein are defined as follows:

Bus watching—The memory bus is monitored (watched) by the slave caches. They compare the transferred address to tag buffer addresses. A special operation can be performed in the case that a match is found. The terms bus snooping or snooping cache are equivalent.

Cache consistency—This is a different term used to describe data consistency in a multiprocessor cache systems.

Data consistency—This is the main problem in multiprocessor cache systems. If a variable is shared by multiple processors it can be cached in multiple caches. The most up-to-date version of the variable should be supplied whenever the variable is accessed. This insures the consistency of the data variables throughout the system.

Data intervention—An operation that can be performed by a slave cache when a match is found in the case of memory-bus read access. If the slave cache contains modified data (the most current version of the data), it intervenes in the access and supplies the data. In this case the main memory should not supply the data.

Exclusive—Indicates that a variable or a cache block is present exclusively in one cache. It can be used exclusively by one processor, or used by more processors but exists only in one cache. In the preferred embodiment of the ICU a LOW in the shared block status bit indicates an exclusive block. The block can be either exclusive non-modified or exclusive modified.

Interlock—Interlock operations are used for temporarily locking a variable (interlock variable) for exclusive usage of one processor. No other processors or caches are allowed to use the variable while it is interlocked. The *LOCK input to the ICU, to be described hereinafter, indicates an interlock operation.

Master cache—A cache which is a master of the memory bus. It issues the request and expects a response.

Match—The address of the memory bus access matches one of the addresses which is present in the tag buffer, and the corresponding word is valid. This term is used for the memory bus address compare, and it is equivalent to the term hit which is used for the processor bus.

Ownership—This is a scheme to guarantee data consistency. The most current value of a variable is owned by one cache or the main memory. It is the responsibility of the owner to maintain the consistency of the variable. There are several ownership schemes which differ in the number of states that are attributed to a variable and the algorithms for ownership and state transitions.

Shared—Indicates that a variable or a cache block is shared by more than one processor. A shared variable can be present in more than one cache. In the preferred embodiment of the ICU a HIGH in the shared block status bit indicates a shared block. The block can be either shared non-modified or shared modified.

Shared modified—A block status in the ICU which indicates that a cache block is shared and modified. It also indicates that the block is owned by the cache, and that it is the most current value of the block in the system.

Slave cache—A cache which is not the master of the memory bus. A slave cache can monitor the memory bus for data consistency purposes.

Snooping—A different term which is used instead of bus watching. Bus snooping or snooping cache are also equivalent.

Having defined the terms to be used herein, a detailed description of the preferred embodiment of the novel ICU will be set out immediately hereinafter in terms of its pin description and functional organization.

With respect to the pin description it should be noted that the term "three state" is used to describe signals which may be placed in the high impedance state during normal operation. All outputs (except MSERR, which will be described hereinafter) may be placed in the high impedance state by the *TEST input (also to be described hereinafter).

Figure 2:
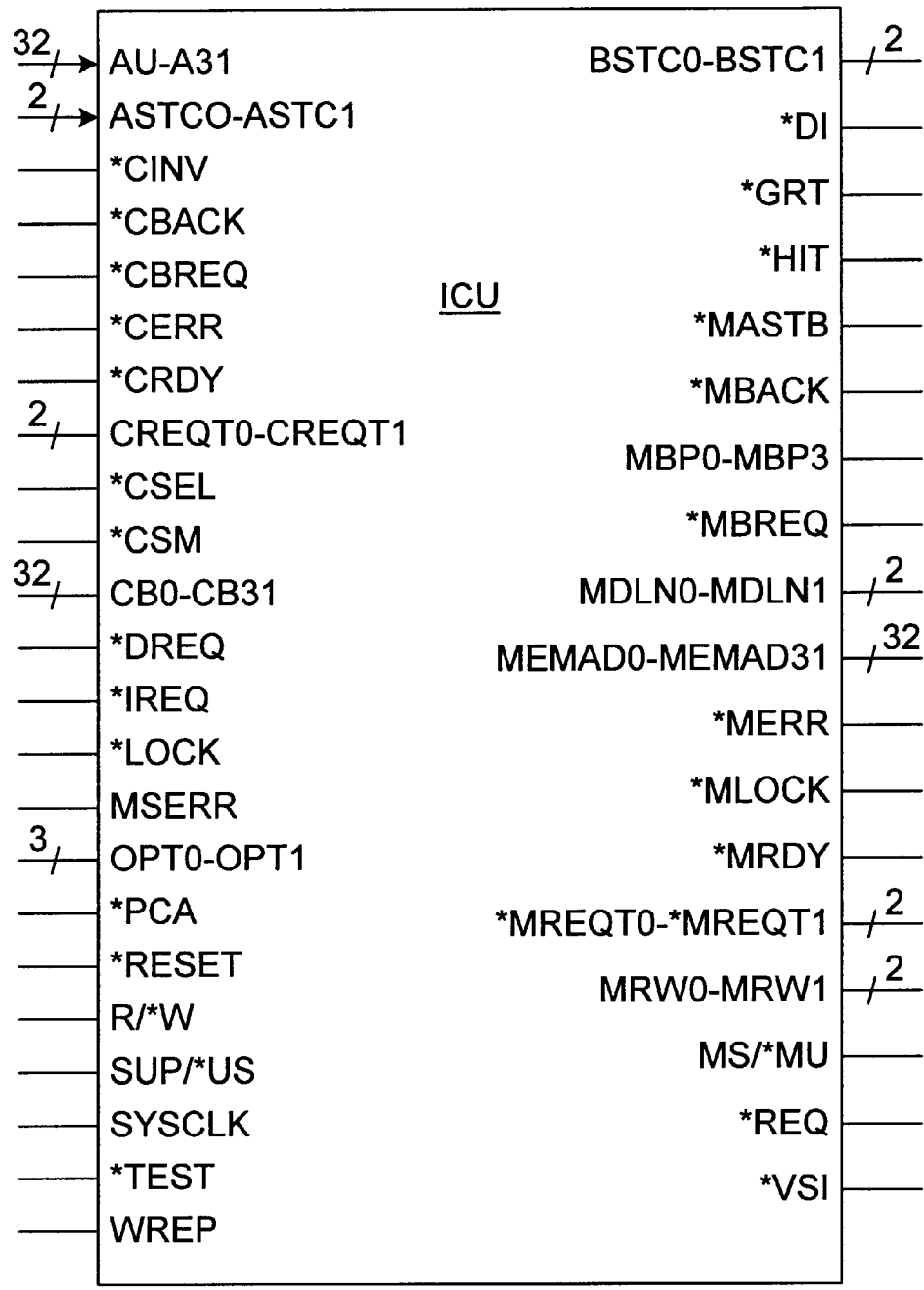
FIG. 2 depicts the pin package and the various inputs and outputs, to/from the novel ICU.

The preferred embodiment of the novel ICU is a CMOS; 169 Pin Grid Array package as shown in FIG. 2.

The processor bus interface will first be described and includes the following:

The Address Bus, pins A0–A31 of FIG. 2, is an ICU input, is synchronous, and transfers the byte address for the cache access on the processor bus.

The Access Status Control signals, shown as ASTC0 and ASTC1 in FIG. 2, are synchronous inputs which specify the status control associated with an access. They are encoded, according to the preferred embodiment of the invention, as follows:

| ASTC1 | ASTC0 | Meaning |
|---|---|---|
| 0 | 0 | Exclusive write-through |
| 0 | 1 | Exclusive copy-back |
| 1 | 0 | Shared |
| 1 | 1 | Non-Cacheable |

These inputs are normally connected to processor 101's MPGM0–MPGM1 outputs as described in the incorporated application. Specifically, the MMU programmable, MPGM0–MPGM1 outputs reflect the value of two bits in a translation look-aside buffer (illustrated as TLB350 in FIG. 3) entry that is associated with the access. *BINV, Bus Invalid, is a synchronous ICU input, active LOW, indicating that the address bus and related controls are invalid. It defines an idle cycle on Processor Bus 120.

*CBACK, Cache Burst Acknowledge, is an ICU output, synchronous, and active LOW. This output is asserted whenever a burst-mode cache access has been established on Processor Bus 120.

*CBREQ, Cache Burst Request, is an ICU input, syncrhronous, and active LOW. This input is used to establish a burst-mode cache access on the processor bus and to request the next transfer during a burst-mode cache access. This signal can become valid late in the cycle compared to *DREQ or *IREQ, to be described hereinafter.

*CERR, Cache Error, is an ICU output, synchronous, and active LOW. This output indicates that an error occurred during the current cache access.

*CRDY, Cache Ready, ia an ICU output, synchronous, and active LOW. For processor bus cache reads this output indicates that valid data is on the Cache Bus. For cache writes it indicates that data need no longer be driven on the Cache Bus.

CRET0–CREQT1, Cache Request Type, is a synchronous input. This signals specify the address space for the cache access on the processor bus as follows:

| CREQT1 | CREQT0 | Meaning |
|---|---|---|
| Data Cache Usage | | |
| 0 | 0 | Memory access |
| 0 | 1 | Input/Output access |
| 1 | x | Coprocessor transfer (ignored by the ICU) |
| Instruction Cache Usage | | |
| x | 0 | Memory access |
| x | 1 | Instruction read-only memory access |

For instruction cache usage CREQT1 has a special function. It is sampled during RESET, and if the sampled value is HIGH, the ICU responds to instruction ROM accesses. If the sampled value is LOW, the ICU doesn not respond to instruction ROM accesses. After RESET the CREQT1 input is ignored for instruction cache usage.

*CSEL, Chip Select, is a synchronous input, active LOW. An active level on the *CSEL input selects the ICU for processor-bus cache instruction accesses. It is not used in normal memory accesses. The *CSEL input can be disabled via the Chip Select Mapping Register, a portion of the ICU to be described hereinafter. When *CSEL is enabled and not asserted the ICU does not respond to processor-bus cache instruction accesses.

*CSM, Chip Select for Memory access, is a synchronous ICU input, active LOW. An active level on the *CSM input selects the ICU for memory accesses. It can be used for cache extensions and cache address space selection. The *CSM input can be enabled via the Chip Select Mapping Register. When *CSM is enabled, The ICU responds to memory accesses only if the *CSM is asserted and the address matches corresponding enabled bits in the preselected field of the Chip Select Mapping Register (to be described in detail hereinafter).

CB0–CB31, the Cache Bus, is bidirectional, synchronous and three state. The Cache Bus transfers instructions or data to and from the ICU on the processor bus.

*DREQ, Data Request, is a synchronous ICU input, active LOW. This input requests a data access on the processor bus. When it is active, the address for the access appears on the Address Bus. For instruction cache usage of the ICU, *DREQ is used for processor-bus cache instruction transfers.

*IREQ, Instruction Request, is a synchronous ICU input, active LOW. This input requests an instruction cache access on the processor bus. When it is active the address for the access appears on the Address Bus. This input has a special function during reset operation of the ICU. It is sampled by the rising edge of SYSCLK, when RESET (to be described hereinafter) is active. The last sampled value determines the ICU operation as a data cache (*IREQ LOW), or as an instruction cache (*IREQ HIGH). For data cache operation, *IREQ should be tied LOW (it is ignored during normal operation). For instruction cache operation, it should be connected to the processor *IREQ output, which is deasserted during RESET. Note that if the processor is placed in Test Mode during RESET, external logic should drive the IREQ HIGH (the processor described in the copending application regarding the high performance interface does not drive IREQ HIGH in its Test Mode).

*LOCK, Lock, is an ICU input, synchronous and active LOW. This input indicates that the processor cache access is to an interlocked variable. The ICU handles this access in a special way to be described with reference to the interlock facility set forth in detail hereinafter.

MSERR, Master/Slave Error, is a synchronous, ICU output, active HIGH. This output shows the result of the comparison of the ICU outputs with the signals provided internally to the off-chip drivers. If there is a difference for any enabled driver, this signal is asserted.

OPT0–OPT2, Option Control, is a synchronous ICU input. These signals reflect the option control bits associated with a cache access. They are used for specifying the data length as well as special access information. The interpretation of these signals is dependent on the usage of the ICU as data or instruction cache. The encoding and interpretation of these inputs, according to the preferred embodiment of the invention, is as follows:

| OPT2–0 value | Meaning (Data Cache) | Meaning (Instruction Cache) |
| --- | --- | --- |
| 000 | 32-bit access | no access |
| 001 | 8-bit access | no access |
| 010 | 16-bit access | no access |
| 011 | no access | no access |
| 100 | instruction memory access (as data) | no access |
| 101 | cache operand transfer | cache operand transfer |
| 110 | debug module access | no access |
| 111 | reserved | reserved |

The OPT inputs are ignored if DREQT1 is HIGH (treated as no access). Codes 100, 101 are treated as no access if DREQT0 is HIGH. Code 100 is used for reading the instruction ROM as data. A data cache responds to this code only if the ROM Enable bit in Moda Register, to be defined hereinafter, is HIGH. In this case the request is treated as a non cacheable access. Code 101 indicates an operand transfer for the ICU processor-bus cache instructions. According to the preferred embodiment of the invention, code 110 is used for a special debug module access. A date cache responds with *CRDY HIGH for four cycles, and then *CRDY is asserted for one cycle.

*PCA, Pipelined Cache Access, is a synchronous ICU input, active LOW. If *DREQ for data cache or *IREQ for instruction cache is not active, this input indicates that the cache access is pipelined with another, in-progress, cache access. The pipelined access cannot complete until the first access is complete. The completion of the first access is signalled by the assertion of *DREQ for data cache and *IREQ for instruction cache.

*RESET, Reset, is an asynchronous input, active LOW. This input resets the ICU.

R/*W, Read/Write, is a synchronous input. This input indicates whether the cache access is a transfer from the ICU to the processor (R/*W High), or from the processor to the ICU (R/*W Low).

SUP/*US, Supervisor/User Mode, is a synchronous input. This input indicates the program mode of the illustrative processor (Supervisor mode or User mode) during the access. The ICU internal registers and the execution of cache instructions are protected from User mode accesses.

SYSCLK, System Clock is an external clock input, at the operating frequency of the ICU.

*TEST, Test Mode, is an asynchronous input, active LOW. When this input is active the ICU is in the Test mode. All outputs and bi-directional lines, except MSERR, are forced to the high-impedance state.

WREP, Way for Replacement, is a synchronous input. This input forces the way number for replacement in a case of a cache miss. It is sampled during the first cycle of a valid cache access. A miss in a two-way set associative organization (if the replacement mode is external), causes replacement as determined by WREP: WREP LOW forces way 0 to be replaced, WREP HIGH forces way 1 to be replaced.

Next, the memory bus interface will be described, making continued reference to FIG. 2. The memory bus may be seen to include:

BSTC0–BSTC1, Block Status Control, which is bi-directional, synchronous and three state. These signals are used to inspect and update the cache block status information. When required by a memory bus instruction, the ICU uses them to indicate the block status bits associated with the supplied address. These signals are also used for supplying the block status from the memory bus for a Write Block Status instruction. The encoding of this signal for both of the above functions is as follows:

| BSTC1 | BSTC0 | Meaning |
| --- | --- | --- |
| 0 | 0 | Exclusive non modified |
| 0 | 1 | Exclusive modified |
| 1 | 0 | Shared non modified |
| 1 | 1 | Shared modified |

*DI, Data Intervention is a synchronous output, three state and active LOW. This output is used for the indication of a data intervention operation on the memory bus. The data intervention operation is used in some multiprocessor configurations, to supply the most updated version of the variable from the appropriate cache (as opposed to memory). The ICU master precharges the *DI signal during the address cycle of a memory bus read access. It then places it in three state mode. The ICUs which are not the bus masters, discharge the *DI signal if they respond with data intervention.

*GRT, Memory Bus Grant, is a synchronous input, active LOW. This input signals that the memory bus is granted for the ICU use.

*HIT, Hit, is bidirectional, synchronous, three state and acitve LOW. This signal can be programmed to be either an output only or an input/output signal. As an output it is used for hit indication. It is asserted when a hit is detected in the tag buffer for the address presented on the memory bus. It is also used in some of the memory bus instruction, to indicate the validity of a word or a block.

When programmed to be an input/output signal it can be used, in addition to the above output functions, as a signal for the detection of hit in any other cache. The ICU master precharges the *HIT signal during the address cycle and then places it in input three state mode. The ICUs which are not the bus masters discharge the *HIT signal only when a hit is detected in their tag buffer.

*MASTB, Memory Address Strobe, is bidirectional, synchronous, three state and active LOW. When the ICU is the Memory Bus master, this signal is asserted by the ICU to indicate that a byte address is present on the memory bus. When the ICU is not a master, this signal indicates that a byte address from another bus master is present on the memory bus. Note that if both instruction cache and data cache are present in the system, two *MASTB signals are available. The two signals can be used to distinguish between instruction and data accesses.

*MBACK, Memory Burst Acknowledge, is a synchronous input, active LOW. This input is active whenever a burst-mode cache access has been established on the memory bus.

MBP0–MBP3, Memory Byte Parity, is bidirectional, synchronous and three state. This is the byte parity bus for transfers on the memory bus. Even or odd parity can be specified. MBP0 is the byte parity for MEMAD0–MEMAD7, MBP1 is the byte parity for MEMAD8–MEMAD15, and so on. For transfers from the ICU to the memory, the ICU generates parity. For transfers to the ICU, it checks the byte parity.

If a parity error is detected, and data is to be transferred on the processor bus, the *CERR signal is asserted. If the data need not be transferred to the processor (e.g. block reload), an error bit is set in the Status Register (to be described hereinafter) and the data is ignored. The parity generation and checking can be disabled. Memory bus data timing are relaxed if parity generation and verification is disabled.

*MBREQ, Memory Burst Request, is bidirectional, synchronous, three state and active LOW. This signal is used to establish a burst-mode access on the memory bus and to request the next transfer during the burst-mode access. When the ICU is the bus master, this signal is an output. When the ICU is not a master, it is an input, used by the ICU for data consistency operations.

MDLN0–MDLN1, Memory Data Length, is bidirectional, synchronous, and three state. These signals reflect the data length for the memory bus data accesses. They are ignored for instruction accesses. For data cache usage the ICU supports 8, 16, and 32 bit transfers. The encoding of these signals are, according to the preferred embodiment of the invention, are as follows:

| MDLN1 | MDLN0 | Meaning |
|---|---|---|
| 0 | 0 | 32-bit access |
| 0 | 1 | 8-bit access |
| 1 | 0 | 16-bit access |
| 1 | 1 | Invalid |

It should be noted that MDLN0 and MDLN1 encoding corresponds to OPT0 and OPT1 for the processor used with the illustrative embodiment of the invention.

MEMAD0–MEMAD31, Memory Address/Data Bus, is bidirectional, synchronous, and three state. The Memory bus is a multiplexed Address/Data bus useed for the memory interface. When *MASTB is asserted, this bus holds the byte address of the Memory Bus access. When the ICU is the bus master, it outputs the address. When the ICU is not the bus master the bus is an input and the address is latched by the ICU for its internal use. When MASTB is not asserted, the memory bus is used to transfer data to and from the ICU.

MERR, Memory Error, is a synchronous ICU input, active LOW. This input indicates that an error occurred during the current memory access. The ICU also uses this signal for data consistency operations.

*MLOCK, Memory Lock, is bidriectional, synchronous, three state and active LOW. This signal indicates that the memory access is an interlocked access. The ICU master asserts this output when an interlocked access is presented on the memory bus. When the ICU is not the bus master, this signal is used as an input. If a match is found for a write access with *MLOCK asserted, the associated word is invalidated. This feature is used for schemes that enable caching of interlock variables.

*MRDY, Memory Ready, is bidirectional, synchronous and active LOW. When the ICU is the bus master, this signal is used as an input. For memory bus reads, this input indicates that valid data is present on the memory bus. For memory bus writes, it indicates that the data need no longer be driven on the memory bus. When the ICU is not the bus master, this signal is used as an input for data consistency operations. It is used as an output for data intervention and memory bus special operations. The ICU asserts *MRDY to indicate that valid data is present on the memory bus.

MRQT0–MREQT1, Memory Request Type, is bidirectional, synchronous and three state. These signals specify the address space for the access on the memory bus. When the ICU is the bus master, it uses these signals as outputs. When it is not the bus master, the MREQT signals are used as inputs for data consistency operations. The encoding, according to the preferred embodiment of the invention, is as follows:

| MREQT1 | MREQT0 | Meaning |
|---|---|---|
| 0 | 0 | Data memory access |
| 0 | 1 | Data input/output access |
| 1 | 0 | Instruction memory access |
| 1 | 1 | Instruction Rom access |

When the ICU is not a bus master the MREQT signals are also used (together with the MRW signals) for specifying a memory bus cache-instruction for the ICU.

MRW0–MRW1, Memory Read Write, is bidirectional synchronous and three state. These signals are used to specify the type of read and write operations on the memory bus. When the ICU is the bus master, it uses these signals to indicate the required operation. When the ICU is not the bus master these signals are inputs, used for data consistency operations. The encoding of these signals, according to the preferred embodiment of the invention, is as follows:

| MRW1 | MRW0 | Meaning |
|---|---|---|
| 0 | 0 | Write |
| 0 | 1 | Read |
| 1 | 0 | Write broadcast |
| 1 | 1 | Read for modify |

The read and write operations referred to hereinabove are relative to the ICU, e.g. read is from the memory to the ICU.

When the ICU is not a bus master the MRW signals are also used (together with the MREQT signals) for specifying the memory bus cache instruction for the ICU. A detailed description of a memory bus instruction set suitable for use with the ICU being described herein, will be set forth in detail hereinafter.

MS/*MU, Memory Supervisor/User Mode, is a synchronous ICU output and is three state. This output indicates the program mode of the processor (Supervisor mode or User mode) during the memory access. The ICU transfers the SUP/*US value presented on the processor bus to the MS/*MU value on the memory bus, for the appropriate transactions.

*REQ, Memory Bus Request, is a synchronous ICU output, active LOW. This output is used by the ICU to request the memory bus.

*VSI, Valid Status or Instruction, is a synchronous, ICU input, active LOW. When the ICU is the bus slave, an asserted *VSI indicates a memory bus cache instruction access. When the ICU is the bus master and it issues a read request for a reload operation, the assertion of *VSI indicates that a special Write Block Status instruction should be executed. A detailed description of a suitable memory bus cache instruction set and the use of *VSI will be set forth hereinafter.

Having described the various inputs and outputs to and from the novel ICU with reference to the pinout diagram of FIG. 2, a complete understanding of the novel methods and apparatus may be had with reference to the detailed description of the ICU's functional organization. This description will be set forth in several parts. First, an overview of how the ICU fits into a computing system, particularly the exemplary RISC system being used to demonstrate the utility and operability of the invention, will be described. Second, the data flow through the ICU will be described in detail. Third, a register level description of a register set suitable for implementing the invention will be set forth. A suitable cache instruction set, a description of data formats and handling, cache accesses and prefetch operations will also be set forth.

Further details on the use of an ICU write buffer, initialization and reset operation will be described hereinafter as well.

Finally, multiprocessor support by the ICU and the special ICU interlock facility will be described to complete the detailed description of the invention.

As indicated hereinbefore, the novel ICU is described in the context of a RISC architecture including a SIP. The preferred embodiment of the invention is described in such a way as to support this architecture. Those skilled in the art will readily appreciate that modifications may be made to the preferred embodiment of the novel ICU, without departing from the scope of spirit of the invention, to support, for example, non-RISC processors. The description to follow is, accordingly, set forth for the purpose of illustration only.

The core of the preferred embodiment of the ICU is an 8k byte memory array with the associated tag and valid arrays. The arrays are organized as a two-way set-associative cache with 4 words per tag (block size=4 words) and a valid bit per word. This basic organization also supports direct mapped cache, variable block and sub-block size as well as a flexible reload scheme. A block status array and LRU array are also incorporated. They are used for cache replacement, locking data in cache, and data consistency policies. The ICU contains all the control logic for the different cache policies, algorithms and instructions. Special registers are implemented for programmable option selection, cache instructions implementation and status report.

Cache policies can be selected by using programmable options. The cache write policy can be programmed as write-through, copy-back or flexible on a per access basis. A write allocate or nonwrite allocate option can be selected. A four word write buffer is incorporated for efficient implementation of write accesses. The write buffer can be enabled or disabled. The replacement algorithm can be programmed as LRU, random or external. A flexible prefetch policy can be selected. Read through option can be enabled. A four word read buffer is incorporated to support efficient prefetching and read operations.

The multiprocessor support policy can be tailored to the system. The level of multiprocessor support can vary from a simple software controlled organization through an extensive ownership scheme. A bus watch capability can be enabled or disabled. The ownership algorithm can be controlled to support the required scheme. Caching interlock variables can be enabled or disabled.

Two chip select inputs and a chip select mapping register allow easy cache extensions as well as multi cache organizations. The reload function can be tailored to the system by selecting the appropriate access control options such as reload size, starting and stopping addresses, burst and wrap around.

Again, the preferred embodiment of the ICU operates at the same frequency of the RISC processor in the illustrative example being set forth, i.e., at a 25 MHZ. nominal frequency with possible higher frequencies. It achieves access times of two cycles for the first hit access and one cycle for the next burst-mode or pipeline hit accesses.

A three IC configuration, one containing the RISC processor and two for ICUs (one for an instruction cache and one for a data cache) is a very high performance cache system with 16k bytes of cache.

As indicated hereinbefore with reference to FIG. 1, the ICU has two interface busses; the Processor Bus and the Memory Bus. It can be connected directly to the RISC processor without any interface logic. The ICU cache bus is connected to the processor's data or instruction bus, for data or instruction cache respectively. Pipelined and burst-mode accesses are supported for maximum utilization of the processor channel. The Memory Bus is a separate interface to the memory, other processors, and the system bus. It is a multiplexed address and data bus with support for burst-mode accesses. It also incorporates multiprocessor support functions. In shared memory multiprocessor environments the memory bus can be used effectively as a shared multi-processor bus. For single processor systems it can be used as the system bus or as a local bus.

The preferred embodiment of the ICU contains special hardware for fault tolerance support. It supports master/slave checking and byte parity generation and checking on the memory bus. For master/slave checking two or more ICUs are connected in parallel with one or more caches (the slaves) checking the outputs of the master. The byte parity generation and checking can be used on the memory bus for reliable bus transfers.

The preferred embodiment of the invention is, as indicated hereinbefore, fabricated in CMOS technology and has a maximum power dissipation of 1.5 W.

Figure 3:
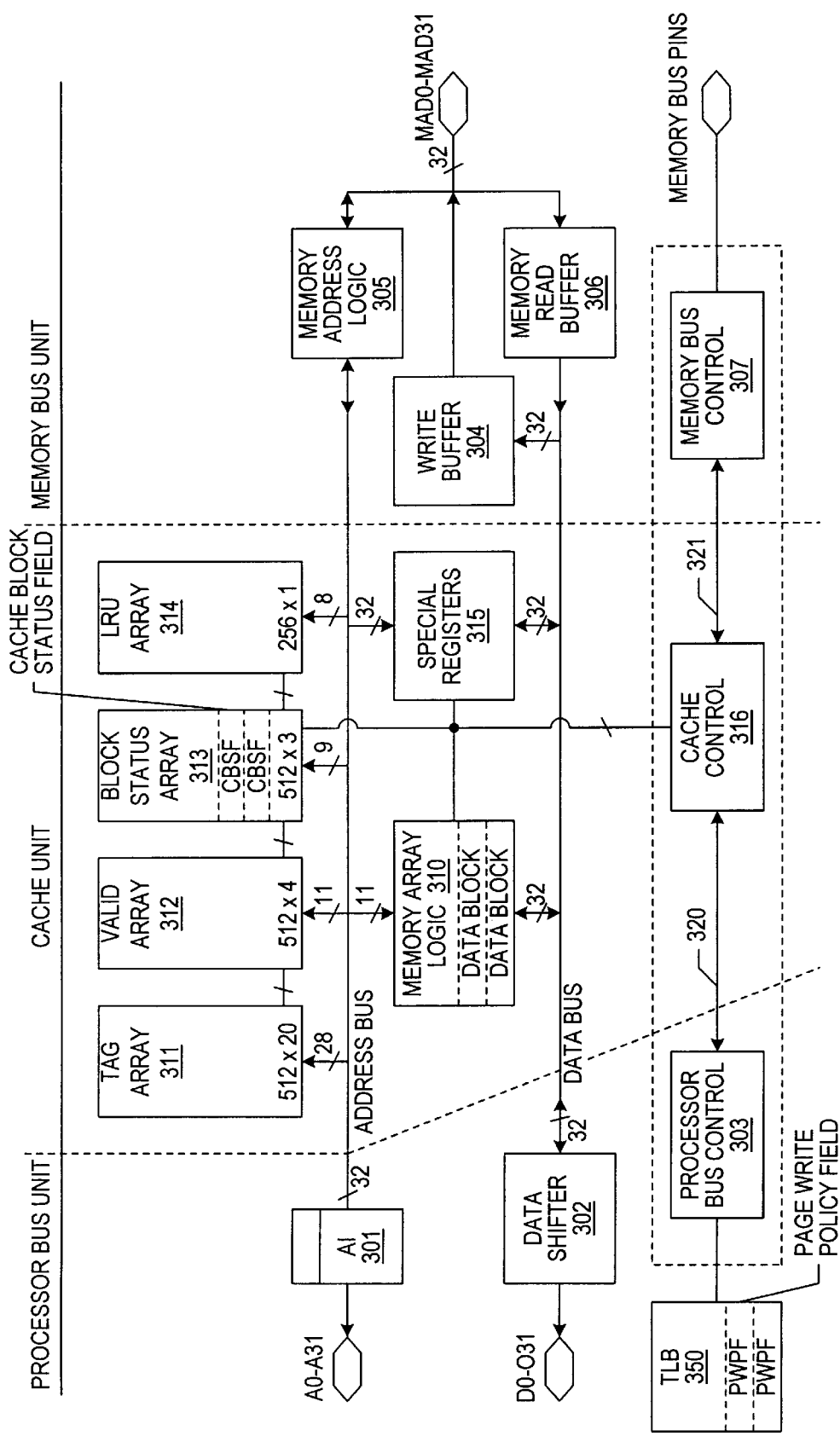
FIG. 3 is a data flow diagram depicting data flow between the processor bus unit and memory bus unit of FIG. 1, via the novel ICU.

The ICU internal data flow organization is shown in FIG. 3. The following description refers to the functional components on this data flow diagram. The ICU is partitioned into three main functional units: Processor Bus Unit, Memory Bus Unit and Cache Unit, each depicted in FIG. 3. The description to follow will from time to time make reference to specific bit locations and fields of various words being used for any number of purposes. One skilled in the art will readily appreciate that these specific references are not intended to be limiting and can be modified to suit a desired application. The specific references are made for the sake of clarity only in setting out a workable, illustrative, preferred embodiment of the invention.

The Processor Bus Unit controls all the Processor Bus activity. It supports all RISC/SIP channel protocols; single, burst and pipelined. It incorporates the Address Incrementer, the Data Shifter and the Processor Bus Control, each to be described immediately hereinafter.

The Address Incrementer (AI) latches the address bus input. It can be incremented on every cycle. The AI output is the address for a cache access. The AI is shown in FIG. 3 as unit 301.

The Data Shifter (DSH) is used for data alignment. It shifts bytes and halfwords and holds the data for cache write accesses. It is also used for the appropriate byte and half-word shift operation in the case of byte and half-word reads. The DSH is shown in FIG. 3 as unit 302.

The Processor Bus Control (PBC) controls the different Processor Bus operations. The PBC is shown in FIG. 3 as unit 303.

The Memory Bus Unit controls Memory Bus activity. It incorporates the Write Buffer, the Memory Address logic, the Memory Read Buffer and Memory Bus Control, each to be described immediately hereinafter.

The Wrtie Buffer (WB) used in the preferred embodiment of the invention, includes two four word first-in, first-out (FIFO) buffers (one for address and one for data). The WB can buffer all ICU write operations. For write through operations it buffers up to 4 byte, half word or word writes. For copy-back operations it buffers a 4 word block. The WB is shown in FIG. 3 as unit 304.

The Memory Address Logic (MAL) includes two address incrementers. The first latches and increments the memory bus addresses for operations from the bus to the ICU. The second latches and increments the addresses for read operations initiated by the ICU. The MAL is shown in FIG. 3 as unit 305.

The Memory Read Buffer (MRB) is a four word data buffer. It buffers the data from the memory bus, until the cache is available for update operation. The MRB is used as a prefetch buffer when prefetching is enabled. The MRB is shown in FIG. 3 as unit 306.

Finally, the Memory Bus Control (MBC), which controls memory bus operaions, is shown in FIG. 3 as unit 307.

The cache unit performs all the cache functions. It incorporates the Memory array, Tag array, Valid array, Block Status array, LRU array, Special Registers, and Cache Control, each to be described immediately hereinafter.

The Memory array is a 64k bits storage array for cached instructions or data. It is organized as two ways of 1024 words. For read operations the two ways are accessed simultaneously, according to the preferred embodiment of the invention, using bits 11-2 of the address. The appropriate word is selected according to the hit signals from the Tag array. For write operations the correct word in the array is written after the Tag access is completed and the hit signals generated. The Memory array is shown in FIG. 3 as unit 310.

The Tag array stores cache tags in a two way set associative organization. Each way is organized as 256×20 bits. Each tag corresponds to a block of 4 consecutive cached words. For each cache access, two tags are accessed simultaneously using bits 11-4 of the address. The tags are compared to bits 31-12 (in one embodiment of the invention) of the address. The hit signals are generated from the comparison results and configuration bits. The Tag array written whenever a miss occurs and a cache block is allocated. The tag is selected according to bits 11-4 of the address and the replacement algorithm. Address bits 31-12 are written to the Tag array. The Tag array is shown in FIG. 3 as unit 311.

The Valid array, unit 312 of FIG. 3, is a 2k bit array that stores a valid bit for each cached word. It is organized as two 1024×1 arrays. A valid bit is set for each word as it is written into the cache. The valid bit is selected by address bits 11-2 (as is the memory array), and the matching way. Two valid bits corresponding to the two ways are checked on every cache access. A hit signal is generated only if the appropriate valid bit is set.

The Block Status array, unit 313 of FIG. 3, is a 1536 bit array that incorporates 3 block status bits per each cache block. It is organized as two 256×3 arrays (this corresponds to the Tag array organization). The three bits are: Modified, Shared and Locked. The Modified bit indicates that the block is modified and should be written back to memory before replacement. It is used for copy-back operations and data consistency operations. The Shared bit indicates that the block is shared. It is used for data consistency operations. The Locked bit indicates that the block is locked and cannot be replaced. It is used for locking important data or instructions in the cache.

The LRU array, unit 314 of FIG. 3, is a 256 bit array which stores the LRU bits. It is organized as a 256×1 array. Each LRU bit corresponds to a set of two tags. The LRU array is used if the Least Recently Used replacement algorithm is selected. The appropriate LRU bit is updated to reflect the least recently used block of the two blocks in a set. When required, the LRU bit determines which block is replaced from the set.

The Special Registers block, shown as unit 315 of FIG. 3, incorporates all the special registers of the ICU. They are used for programming the ICU options, controlling special operations, and holding status information.

Finally, the Cache Control block, unit 316 of FIG. 3, includes control logic for the cache operations.

Having set forth and described data flow through the novel ICU with reference to FIG. 3, attention will now be turned to a register structure to support the data flow and control of the ICU.

The preferred embodiment of the ICU contains 8 special registers. These registers select programmable options, support cache control operations, and indicate cache status information. Each register can be read or written by the processor via the processor bus or the memory bus. A read register or write register cache instruction is transferred to the ICU using the appropriate cache instructions protocol on one of the buses. For the processor-bus instructions, the register number is specified by the three least significant bits of the opcode. The instruction transfer protocol and the ICU response are controlled by the Read Register Control and Instruction Transfer Protocol Control in the Modb Register respectively. For the memory-bus instruction the register number is specified by the three least significant bits of the address. A detailed description of the these illustrative protocols and responses will be set forth hereinafter.

For processor-bus accesses, all ICU special registers are protected. They can be accessed only if the SUP/*US imput is HIGHT. User mode accesses are not executed. A *CERR response signals an invalid User mode access. The registers are not protected for the memory bus cache instruction.

According to the preferred embodiment of the invention, each register is assigned a number as follows:

| reg# | reg name |
|------|----------|
| 0 | Chip Select Mapping |
| 1 | Instruction |
| 2 | Address Operand |
| 3 | Count |
| 4 | exception Address |
| 5 | Status |
| 6 | Moda |
| 7 | Modb |

Only the general function of each register will be described hereinafter since one skilled in the art will appreciate that specific bit assignments may be made for application dependent purposes.

The Chip Select Mapping Register is special register 0. It specifies the address and the conditions for the ICU chip select functions. The ICU has two independent chip-select functions: for normal cache accesses and for cache instruction accesses.

For normal cache accesses, the chip-select function can be used for cache extensions, cache address space assignments, and multiple-cache configurations. In the preferred embodiment of the invention, up to 32 ICUs (16 instruction caches and 16 data caches) can be used without external chip-select hardware. Memory access (MA) selection is also affected by the *CSM input and a Memory Bit Enable field of the Moda Register. If the *CSM input is enabled, it must be asserted to enable a memory access. If the *CSM input is disabled, it is ignored. The Memory Bit Enable Field can selectively enable the comparison of an appropriate address bit to a corresponding (MA) field bit in the chip-select memory register. When a bit is disabled for comparison, it is ignored. If all the bits are disabled, a match is forced. Note that when the *CSM is enabled, it should be asserted and the MA field comparison match, for a memory access to be serviced.

For cache instruction accesses, the chip-select function is used for selecting the appropriate ICU for the access. A cache instruction access is enabled when *CSEL is asserted and enabled, or when the address inputs A31–A14 and CREQT0 match Cache Instructions Address and Cache Instruction Address Space fields in the Chip Select Mapping Register. In the second case, all the caches with a match are selected. If the instruction scope is multiple caches, all the selected caches respond. If the instruction scope is one cache, only the cache where the address inputs A13–A8 match a Specific Cache Number field of the Chip Select Mapping Register, responds.

During initialization the *CSEL input is used to program the Chip Select Mapping Registers of a given ICU. In a typical configuration, a different address bit can be connected to the *CSEL of different ICUs. When *CSEL is asserted and enabled, the ICU treats data accesses as cache instruction accesses. After the Chip Select Mapping Register is programmed, the *CSEL input can be disabled, and the mapping specified by the Chip Select Mapping Register applies.

The Instruction Register is special register 1. It is used for specifying an instruction to the ICU. The Instruction Register can be read or written as any other special register, however, it is also loaded automatically for a valid cache instruction. A valid cache instruction is detected when the *CSEL input is asserted and enabled or when the address inputs A31–A14 and CREQT0 match the Cache Instructions Address and Cache Instructions Address Space fields in the Chip Select Mapping Register. In these cases, the instruction is copied from the address inputs A7–A0.

The Instruction Register can be accessed as a special register for saving and restoring the ICU state in the case of a processor interrupt during the instruction transfer protocol, or if a multiple cache instruction is interrupted. When it is accessed as a special register, a Read or Write Register cache instruction is transferred to the ICU. Shadow registers are incorporated in order to be able to latch the Read Register instruction and optional operand, without destroying the required old contents of the Instruction and Operand Register. The shadow Instruction Register is first loaded with an instruction. For all the instructions except the Read Register and the Write Register instructions, the Instruction Register is updated when the instruction execution is started. For the Read Register and Write Register instructions the Instruction Register is updated only if there is no other valid instruction in the Instruction Register. If a valid instruction is present in the Instruction Register, the Read Register instruction is executed without affecting the Instruction and Operand registers. This feature is also used for checking the status of the ICU without affecting the execution of a cache instruction.

An instruction is executed by the ICU whenever all the required operands are valid. A detailed description of exemplary instructions, required operands, and cache-instructions accesses will be set forth hereinafter.

The Operand Register is special register 2. It specifies an operand for certain ICU instructions. The register contains a bit (OV bit) to indicate the validity of the Operand Register value. A shadow Operand Register is incorporated in the ICU for correct execution of Read Register and Write Register instructions. The shadow Operand Register is first loaded with an operand. For all the instructions, except Read Register and Write Register instructions, the Operand Register is updated if the validity bit is reset. If the OV bit is set, the ICU delays the *CRDY response until the OV bit is reset (the previous instruction completion), and then loads the register. For Read Register or Write Register instructions the Operand Register is updated only if there is no other valid instruction in the Instruction Register. If a valid instruction is present in the Instruction Register, the Read Register and Write Register instructions are executed without affecting the Instruction and Operand registers. This enables saving and restoring the Operand Register, when required. When required, the Operand Register can be read or written by using Read Register or Write Register instructions.

The Count Register is special register 3. It specifies the number of words to be operated on by certain ICU instructions. The Count Register is not affected by the instruction execution.

The Exception Address Register is special register 4. It is used for reporting the address associated with some exceptions. The Exception Address register is loaded with the exception address. The exception type can be found in the Status Register.

The Status Register is special register 5. It is used for reporting the status of the ICU, and for information transfer between the ICU and the processor in the Read Tag and Write Tag cache instructions (to be explained hereinafter). Bits are reserved for reporting the tag value for the Read Tag instruction and for transferring the tag for the Write Tag instruction; for the reporting of the WAY for cached data; for reporting the valid bits for a block and for transferring the valid bits for the Write Tag instruction; for reporting the locked bit for the block and for transferring the locked bit for the Write Tag instruction; for reporting the shared bit for the block and for transferring the shared bit for the Write Tag instruction; for reporting the modified bit for the block and for transferring the modified bit for the Write Tag instruction; for indicating if a hit is found in the cache; and for indicating protection violations; illegal instructions; memory errors and parity error.

The Moda Register is special register 6. It is used for selecting various ICU options. The Moda register is reset during initialization.

Fields are set aside to: control global cache operation; to lock all cache locations; to disable the write buffer; and to disable the read through option.

A ROM enable bit is included in this register which has different functions for instruction cache and data cache usage ("ROME" bit).

For instruction cache usage when this bit is set, the ICU responds to ROM accesses and caches them. When it is 0, ROM accesses are ignored.

For data cache usage, when this bit is set, the data cache is enabled for instruction memory accesses (as data). When the OPT inputs indicate an instruction memory access, the ICU treats it as a non-cacheable transaction. The specified address is read on the memory bus and transferred to the processor, without loading it into the cache. When the ROME bit is 0, the ICU ignores this type of transaction.

Further fields are provided in the register to enable the prefetch option for single accesses; to disable an address wrap around option; to control the ICU operation on a single access miss; to control the ICU operation when a burst mode read request is terminated by the processor; to enable the prefetch option for burst accesses; and to select sub-block size (SBS).

It should be understood that the sub-block size is used in the control of cache reload operations. The number of words to be reloaded into the cache for a single cache miss is defined by the defined sub-block size and the information stored in the field controlling ICU operation for an access miss (for example, control information such as start and stop on a sub-block boundry). The SBS field is also used, together with the burst mode control information, in the burst end control. The inherent block size of the ICU is 4 words, one tag is associated with four data words. The sub-block size is either 1, 2 or 4 words.

Still further, the Moda Register contains fields for controlling the extension of memory bus address transfers; for indicating whether a write allocate option is on; and for selecting the write policy options on a global basis.

According to the preferred embodiment of the invention, the write policies are: flexible, write-through or copy-back.

When a write-through policy is selected, every processor write to the ICU is also written to the memory. When a copy-back is selected, every processor write hit is written in the cache and the modified bit set. The block is copied back to memory only when the block is replaced. When the flexible policy is selected, a write-through or copy-back operation can be selected on an access by access basis. The write policy for an access, is also affected by the ASTC inputs, the block status shared information, and the Write Shared Hit Control and the Processor Status Bit Control fields of the Modb Register (to be explained hereinafter).

The Moda Register also contains a field used to select the block replacement policy. The selection is not used for direct-mapped organization. In a two-way set-associative organization, if one of the blocks is not valid, it is chosen for the new block. The replacement policy options, according to the preferred embodiment of the invention, are: Least Recently Used (LRU), random, or external.

When the LRU policy is selected, the LRU array is used for the selection of the block to be replaced. The LRU array is updated on each cache access. One bit is associated with each set. It points to the least recently used block from the two blocks in a set.

When the random policy is selected, a pseudo random logic selects the block to be replaced. The logic is a simple flip flop which change state every clock cycle, and used for all the sets.

When the external policy is selected, the WREP input is latched with the processor address. The latched value forces the replaced block selection. This option may be used for cache testing and multi-level cache organizations.

Finally, the Moda Register contains fields for selecting the cache organization (two-way set-associative or direct-mapped); for selecting the cache operation as Instruction Cache or Data Cache; for controlling parity generation and checking options and memory bit enable information for enabling the corresponding MA bits in the Chip Select Mapping Register for address comparison on Memory accesses.

The Modb Register is special register 7. It is used for the selection of various ICU options. One field of the Modb Register is associated with multiprocessor organizations. A detailed description of multiprocessor organizations and the usage of this field will be described hereinafter.

The Modb Register also contains a bit for controlling the ICU for Input/Output data accesses on the processor bus (it is ignored in instruction cache usage); a bit which specifies the mode of reading the ICU registers; a bit which specifies the protocol for cache instruction transfer on the processor bus; and a bit which controls the byte and half-word ordering within a word, for the relevant ICU operations.

The multiprocessor oriented information in the Modb Register includes: a Cache Interlocked Enable bit;

a Read Bus Watch Enable bit; a Write Bus Watch Enable; a field which controls the operation of the ICU in the case of a match on memory bus read by another master; a field which controls the operation on match for memory bus write operation by another master; a Write Miss Memory Access Control which controls the memory bus operation of the ICU for a copy-back write miss with write-allocate; a Write Shared Hit Control field which controls the operation on a write hit to a shared block; a Processor Shared Bit Control which causes the block status share bit to be modified for every processor access when set; and an External Shared Bit Control which controls the assignment of the shared block stauts by external control. For external shared control, the *HIT signal is used as an input for memory bus read and/or write accesses. If it is asserted, then the data is also present in other caches, and the block is assigned a shared status. If the *HIT input is not asserted, the variable is not present in any cache and the block is assigned an exclusive status. Detailed description of this feature is set forth hereinafter with reference to ICU multiprocessor support.

Turning to the ICU instruction set.

The preferred embodiment of the ICU implements 20 processor bus cache instructions, and 9 memory bus cache instructions. The processor bus instructions are issued by the processor for special register accesses and for special cache operation requests. The memory bus instructions are issued by special logic on the memory bus for special cache operation requests. This section sets forth examples of different instruction transfer protocols and sets forth an example of a typical processor bus instruction and a memory bus instruction set, in detail.

The processor bus cache instructions and operands are transferred to the ICU from the processor by a special sequence of processor bus transactions. The instruction is executed whenever all the required operands are transferred to the ICU.

Some processor bus cache instructions have four optional scopes of operation. The instruction scope specifies the number of ICUs which are affected by a cache instruction. The scope is designated by (s) in the instruction table. The instructions without the (s) indication can operate only on one specific ICU. The instruction scope can be designated as follows:

| specified (s) | Opcode 2 significant bits | Meaning |
|---|---|---|
| 0 | 00 | One specific ICU affected |
| I | 01 | All instruction caches affected |
| D | 10 | All data caches affected |
| A | 11 | All caches affected |

This flexibility allows a system designer to issue cache instructions which operate on the desired addresses in the appropriate caches. In a multiple ICU environment, it is more efficient to issue one instruction that will operate on all the caches simultaneously. For example, the Invalidate Block instruction with (s)=A (INVBA), invalidates the specified block in all the ICUs (where the block is valid) in parallel.

Most instructions are executed in two cycles. However, there may be exceptions as will be indicate hereinafter. During processor bus cache instruction execution, the ICU can accept other processor transactions, (including new instruction transfers) but in most cases (unless otherwise specified in the instruction description) they are serviced only after the processor bus cache instruction is completed Memory bus transactions are serviced during the processor bus cache instruction execution. However, since they are not synchronized to instruction execution, the ICU operation reflects the current state of the cache.

All processor bus cache instructions are privileged. If the SUP/*US input is LOW, when the processor bus cache instruction access is performed, it is ignored and the *CERR asserted as a response. The Status Register is updated with status information for the relevant instructions. In case of an exception the Exception Address Register and the Status Register are updated with the exception information.

There are several options for the communication between the ICU and the processor during cache instruction execution. The protocol is defined according to the Instruction Transfer Protocol Control (ITPC) and Read Register Control (RRC) bits of the Modb Register as well as the cache instruction type and scope. All instructions, except Read Register, are transferred by using a write operation. The Read Registers instruction is transferred by using a read or write operation as defined by the Read Register Control bit of the Modb Register. A description of these options can be found in Read Register instruction description set forth hereinafter.

The first part of each instruction is the detection of a processor bus cache instruction request. A processor bus cache instruction request can be either a read or write processor bus access. It is detected by the ICU in two cases: 1) The *CSEL is asserted and enabled or 2) the address inputs and CREQT0 match the Cache Instruction Address and Cache Instruction Address Space fields in the Chip Select Mapping Register.

When no operand is required for the instruction execution, the transfer is completed in one cycle. In this case the value on the cache bus is irrelevant and the instruction execution starts immediately.

If operands are required, there are two optional transfer protocols which are supported by the ICU. The protocol is selected according to the Instruction Transfer Protocol Control bit of the Modb Register.

When ITPC is 1, the cache bus is used for the operand transfer. The processor uses a normal write operation, and the processor address and data buses are both used. The ICU latches the operand value from the cache bus. For ICU used as an instruction cache, external transceivers are required for transferring the data from the ICU data bus to the cache bus. This option is the natural selection for ICU used as a data cache. A more efficient protocol is also achieved for ICU used as an instruction cache in the expense of external transceivers.

When ITPC is 0, the cache bus in not used. Operands are transferred on the processor address bus. A special two cycle protocol is required for instruction and operand transfer. After a valid instruction is latched, the ICU expects a special data transaction on the processor bus. The CREQT inputs should specify a memory data transaction, the option inputs should specify a cache operand transfer, and the address bus contains the operand. This special write transaction is detected by the ICU and the operand on the address bus latched. Note that the above transaction should be ignored by all other elements connected to the processor bus. This option is less efficient than the other, but is does not require transceivers for ICU used as an instruction cache.

Both options can be selected independently for ICU used as a data cache or an instruction cache. However, from system programming point of view, it might be desirable to access both caches in a similar way. If this is the case, both caches can be programmed to respond to the same protocol.

If a count operand is required for the instruction execution, a Write Register Instruction should be executed for writing it to the Count Register before the instruction execution starts. The instruction is executed by the ICU whenever the instruction and all the required operands are valid.

Processor interrupts can happen during the cache instruction transfer protocol. The preferred embodiment of the ICU includes logic to recover from such cases. The Instruction Register, Operand Register, and Count Register can be read for saving their content without affecting it, using the Write Register instruction. The Instruction Valid, Operand Valid, and Count Valid bits indicate the validity of the corresponding register. The save and restore operations enable the instruction transfer protocol to continue from the point of interruption.

A set of Processor bus cache instructions found useful in one embodiment of the invention, in terms of Mnemonic, description and brief explanation of purpose, set forth immediately hereinafter in tabular form:

| Mnemonic | Description |
|---|---|
| NOP | No Operation |
| INVW(s) | Invalidate word |
| INVB(s) | Invalidate block |
| INVM(s) | Invalidate multiple |
| INVA(s) | Invalidate all |
| SWM(s) | Send word if modified |

-continued

| Mnemonic | Description |
| --- | --- |
| SBM(s) | Send block if modified |
| UPMI(s) | Update memory and invalidate |
| UPIM(s) | Update memory and invalidate multiple |
| LCK(s) | Lock block |
| ULCK(s) | Unlock block |
| RBST(s) | Read block status |
| WBST(s) | Write block status |
| SWH | Send word if hit |
| RTAG | Read tag |
| WTAG | Write tag |
| PRLD | Preload cache |
| RST | Reset |
| RDR(i) | Read register |
| WRR(i) | Write register |

It should be noted that the (s) symbol in the instruction mnemonic indicates the instruction scope as previously defined herein and the (i) symbol in the RDR and WRR instructions indicates the register number which is specified by the 3 least significant bits of the opcode.

It should also be noted that specific operands (although not discussed herein) are specified according to instruction requirements. If more than one operand is to be specified, a WRR instruction is required for loading the second specified operand.

On a functional level, the execution of the instructions result in the following actions:

No Operation (NOP), no operation is executed by the ICU for this instruction.

Invalidate Word (INVWO, INVWI, INVWD, INVWA) (note different scopes)—the word specified by an address operand is invalidated (the corresponding valid bit is reset).

Invalidate Block (INVBO, INVBI, INVBD, INVBA)—the four word block specified by the address operand is invalidated (all the corresponding valid bits are reset).

Invalidate Multiple (INVMO, INVMI, INVMD, INVMA)—multiple sequential four word blocks are invalidated by the ICU. Every single operation is similar to the INVB instruction. The instruction is executed in multiple cycles (two cycles for initialization+one cycle per four word block). For this instruction, the Count Register must contain a valid count. The Count Register is loaded by using the Write Register instruction. The Count Valid bit remains set after the instruction execution. To guarantee correct execution, the Count Register should either be loaded before the INVM instruction is requested or should contain the correct value from a previous operation. This instruction can be used in order to invalidate a page frame. The Count Register should contain the number of four word blocks in a page (page size in bytes divided by 16).

Invalidate All (INVAO, INVAI, INVAD, INVAA)—this instruction invalidates all words in the cache. All valid bits are reset.

Send Word if Modified (SWMO, SWMI, SWMD, SWMA)—if the word specified by the address operand is present in the cache and the modified bit for the block is set, it is written to the corresponding address in memory.

Send Block if Modified (SBMO; SBMI, SBMD, SBMA)—if the four word block specified by the address operand is modified, all the valid words are written to the corresponding addresses in the memory.

Upadate Memory and Invalidate (UPMIO, UPMII, UPMID, UPMIA)—if the four word block specified by the address operand is modified, all the valid words are written to the corresponding addresses in the memory. Then, all the valid bits are reset. The write operation is performed by using a burst mode or single memory bus write access (depending on the number of valid words), after the memory bus is granted to the ICU.

Update Memory and Invalidate Multiple (UPIMO, UPIMI, UPIMD, UPIMA)—multiple sequential Update Memory and Invalidate operations are executed by the ICU. Every single operation is similar to the Update Memory and Invalidate instruction. The instruction is executed in multiple cycles (two cycles for initialization plus one cycle and optional memory bus four word write access per four word block). For this instruction, the Count Register must contain a valid count. The Count Register is loaded by using the WRR instruction. The Count Valid bit remains set after the instruction execution. To guarantee correct execution, the Count Register should either be loaded before the UPIM instruction is requested or should contain the correct value from a previous operation. This instruction can be used in-order to update memory and invalidate a page frame. The Count Register should contain the number of blocks in a page (page size in bytes divided by 16).

Lock block (LCKO, LCKI, LCKD, LCKA)—if the four word block (or part of it) specified by the address operand is present in the cache, the corresponding block status Lock bit is set.

Unlock block (ULCKO, ULCKI, ULCKD, ULCKA)—if the four word block (or part of it) specified by the address operand is present in the cache, the corresponding block status lock bit is reset.

Read Block Status (RBSTO, RBSTI, RBSTD, RBSTA)—the specified word address is checked for presence in the cache and the status register is updated accordingly.

Write Block Status (WBSTO, WBSTI, WBSTD, WBSTA)—the block which includes the specified word address is checked for presence in the cache. If the block is present in the cache then the block status bits are updated based on the value of the bits in the status register.

Send Word if Hit (SWH)—if the word specified by the address operand is present in the cache, it is written to the corresponding address in the memory.

Read Tag (RTAG)—this instruction is used for reading a specific tag in the cache.

Write Tag (WTAG)—this instruction is used for writing a specific tag in the cache.

Preload (PRLD)—preload is a special operation that can be performed in order to load a cache with specific data variables or instructions before they are needed. The operation is done under software control. The addresses of the required variables or instructions are supplied by the user. Note that the preload operation is different from simple prefetch operations. Prefetch is usually done under hardware control, and the prefetched addresses are in the close neighborhood of the address for the original memory request.

User and compiler knowledge of the program should be used in order to predict the most valuable instructions or data variables. The appropriate addresses are preloaded into the instruction and data caches before the program execution is started. The operation can be done under the cache control without the processor interference. This allows better utilization of the cache and higher overall performance.

The preload operation, novel unto itself, is described in the context of the incorporated RISC/SIP architecture. It can be used in other cache systems as well.

The instruction is initiated by the processor by transferring the opcode and the operands to the appropriate cache unit. Two operands are required: an address operand and a count operand. Multiple sequential words are loaded to the cache, using memory bus read burst transaction, under the ICU control. The address operand specifies the starting word address. The Count Register specifies the number of four word blocks. When the highest possible address is reached, a wrap around is performed.

The instruction is executed in multiple cycles (two cycles for initialization plus one memory bus burst read access per word). For this instruction, the Count Register must also contain a valid count. The preload instruction can be used in various methods. Two basic options are as follows:

A simple method of using the preload instruction does not require special cache configuration and can be used with any cache system. In this method, the preload instruction is issued under software control before the program execution. The instruction can be issued as part of the context switch procedure. Since the caches are preloaded the cold start effect is minimized. The main disadvantage of this method is that the preload operation can interfere with other cache operations which are required by the processor.

A more complex cache configuration can overcome the above limitation. This configuration (referred to as switchable caches) require more than one cache per each processor, and a method to switch between the caches. The switchable caches configuration allows the operation of multiple caches on the same address space. Two or more caches are placed in parallel, but only one of the caches is enabled for processor memory accesses response. The other cache or caches can be programmed to preload the variables or instructions which are required for the next program (or procedure). Before the execution of the next program starts, the appropriate cache (which includes the preloaded data) is enabled, and the other caches disabled.

The implementation of this scheme is fully supported by the ICU. All the necessary support is implemented on the single chip. An individual ICU can be disabled or enabled by programming a mode register. The preload instruction is implemented so that this scheme is supported. Specifically the ICU can perform the preload instruction, even if it is disabled for normal cache operations. Two or more ICUs can be placed in parallel and only one can be enabled for normal cache operations, while the other performs preload operations (no glue logic is required).

This configuration can have a significant performance advantage, since the preload operations are performed with minimal impact on the current program execution.

Reset (RST)—the Reset instruction performs the same function as performed by asserting the *RESET input. The ICU is initialized. The RST instruction is executed immediately as it is accepted. A multiple instruction (INVM, UPIM, PRLD) execution is terminated.

Read Register (RDR)—the Read Register instruction is used for reading the special registers of the ICU. The special register number is specified by the opcode. The ICU responds in different ways to this instruction depending on the state of a Read Register Control (RRC) bit in the Modb Register. When RRC is 1, a read transaction with the instruction on the address bus initiates the instruction. When RRC is 0, the main memory is used in order to read the registers.

Write Register (WRR)—the Write Register instruction is used for writing the special registers of the ICU. The special register number is specified by the opcode. The data is specified as the instruction operand. The WRR instruction is executed immediately as it is accepted. If valid instruction and operand are present in the Instruction and Operand registers, it is executed without affecting their content. This feature can be used for restoring the ICU registers.

As indicated hereinbefore, the memory bus cache instructions are issued by special logic on the memory bus. This logic should be able to direct the instruction to the appropriate ICU. All the ICUs in the system which recognize a valid instruction on their inputs execute it. There are no equivalent concepts to the processor bus instruction scope and privileged instructions on the memory bus.

All the memory bus cache instructions can be transferred to the ICU, when it is the bus slave, by using one cache instruction transfer memory bus transaction. The Write Block Status instruction can be also transferred when the ICU is the bus master, by asserting the *VSI input. The instruction is executed whenever the required cache resources are available, after the instruction and the operands are accepted. All the instructions are executed internally in two cycles. In the case that a memory bus operation is required for the instruction execution, the number of the cycle for the bus operation should be added.

The memory bus cache instructions are executed independently of other ICU operations on the processor bus (including the processor bus cache instructions). The memory bus instructions and the processor bus operations are executed according to the order in which they are received. The result of the memory bus instruction reflects the current state of the cache. If a memory bus cache instruction is accepted during the execution of a multiple processor bus cache instruction, it is executed without affecting the multiple instruction execution.

All of the memory bus cache instruction, except Write Word in Cache, has an equivalent processor bus cache instruction with a similar name. These instructions have a similar effect on the internal cache, however, the processor bus and memory bus operations are different.

All the memory bus cache instructions are transferred using one cache instruction transfer memory bus transaction. When the ICU is not the bus master, the assertion of *VSI causes a cache instruction transaction on the memory bus. During the first cycle of the transaction, the MRW, MREQT, BSTC signals, and the address are latched. The MRW and MREQT signals specify the instruction. The BSTC signals specify the block status for the relevant instructions. The address is used as the address operand for the relevant instruction. If the instruction requires data operand, the data is latched during the second cycle.

When the ICU is the bus master, and it issues a read request for reload operation, the *VSI input has a special function. If it is asserted before the transaction is completed (the last *MRDY has not been accepted), then the BSTC signals are latched, and a Write Block Status instruction is executed. The address operand is the block address which corresponds to the address that was transferred by the ICU for the reload operation.

A set of memory bus cache instructions found useful in one embodiment of the invention, in terms of Mnemonic, description and brief explanation of purpose, are set forth immediately hereinafter in tabular form:

| MRW | MREQT | Mnemonic | description |
|-----|-------|----------|-------------|
| 00  | 00    | NOP      | No operation |
| 00  | 01    | SWH      | Send word if hit |

-continued

| MRW | MREQT | Mnemonic | description |
|-----|-------|----------|-------------|
| 00  | 10    | SWM      | Send word if modified |
| 00  | 11    | SBM      | Send block if modified |
| 01  | 00    | INVW     | Invalidate word |
| 01  | 01    | INVB     | Invalidate block |
| 01  | 10    | WBST     | Write block status |
| 01  | 11    | WRR      | Write register |
| 10  | 00    | UPMI     | Update memory and invalidate |
| 10  | 01    | RBST     | Read block status |
| 10  | 10    | RDR      | Read register |
| 11  | 00    | WRW      | Write word in cache |

It should be noted that the instruction codes are arranged so that MRWO is consistent with other memory bus operations. For MRWO LOW, the direction is from the ICU to the memory bus and for MRWO HIGH, the direction is from the memory bus to the ICU.

On the functional level, the execution of the instructions result in the following actions:

No Operation (NOP)—this instruction has no affect on the ICU. The memory bus cache instruction transaction protocol is performed as for any instruction.

Send Word if Hit (SWH)—if the word specified by the address operand is present in the cache, the *HIT signal is asserted. The word is driven on the memory address bus, the block status shared and modified bits are driven on the BSTC signals, and the *MRDY is asserted.

Send Word if Modified (SWM)—if the word specified by the address operand is present in the cache and the modified bit for the block is set, the *HIT and the *MRDY signals are asserted, and the block status shared and modified bits are driven on the BSTC signals. Then, the word is written to the corresponding address in the memory.

Send Block if Modified (SBM)—if the four word block specified by the address operand is modified, the *HIT and the *MRDY signals are asserted, and the block status shared and modified bits are driven on the BSTC signals. Then, all the valid words are written to the corresponding addresses in the memory.

Invalidate Word (INVW)—the word specified by the address operand is invalidated (the corresponding valid bit is reset). The *HIT signal is driven according to the hit or miss conditions and the *MRDY asserted after the instruction execution is completed.

Invalidate Block (INVB)—the four word block specified by the address operand is invalidated (all the corresponding valid bits are reset). The *HIT signal is driven according to the hit or miss conditions and the *MRDY asserted after the instruction execution is completed.

Write Block Status (WBST)—this instruction can be executed either when the ICU is the bus slave or the bus master. When the ICU is the slave the address operand is specified by the memory bus transaction. In this case, the block which includes the specified word address is checked for presence in the cache. If the block is present then the *HIT and *MRDY signals are asserted, and the block status bits are copied from the BSTC signals. If the block is not present in the cache then the *HIT signal is deasserted and the *MRDY asserted. The Hit and Valid bits of the Status Register are reset.

When the ICU is the bus master and it issues a read request for a reload operation the *VSI input has a special function. If it is asserted before the transaction is completed (the last *MRDY has not been accepted), then the BSTC signals are latched, and the Write Block Status instruction is executed. The address operand is the address that was transferred by the ICU for the reload operation. In this case, the block which includes the specified word address is always present in the cache (since it is being reloaded). The block status bits of this block are copied from the BSTC signals. The Status Register is not affected.

Write Register (WRR)—the Write Register instruction is used for writing the special registers of the ICU.

Update Memory and Invalidate (UPMI)—if the four word block specified by the address operand is modified, the *HIT and the *MRDY signals are asserted and the block status shared and modified bits are driven on the BSTC signals. Then, all the valid words are written to the corresponding addresses in the memory, and then the valid bits are reset.

Read Block Status (RBST)—the specified word address is checked for presence in the cache. The block status bits are driven on the BSTC signals. The *HIT and *MRDY are also driven accordingly.

Read Register (RDR)—the Read Register instruction is used for reading the special registers of the ICU.

Write Word in Cache (WRW)—if the word specified by the address operand is present in the cache, the *HIT signal is asserted and the supplied data is written into the cache. The two least significant bits of the address are ignored. Note that the address cycle is specified by the *VSI input and not by the *MASTB signal. The data is specified by the value on the memory bus during the cycle following the address cycle. If the word is not present in the cache the *HIT signal is deasserted and the Hit and Valid bits of the Status Register are reset. The *MRDY signal is asserted when the ICU latches the data from the memory bus.

Having completed the description of a suitable and useful instruction set for use with the preferred embodiment of the invention, a brief description of data formats and data manipulation mechanisms supported by the novel ICU will now be set forth.

As indicated hereinbefore, a word is defined as 32 bits of data. A half word consists of 16 bits. A byte consists of 8 bits. The ICU has direct support for word, half word and byte accesses. On the processor bus, the access length is determined according to the OPT inputs. The access length is effective only for single data memory accesses. It is ignored and a word length is assumed, in all other processor bus accesses (including burst mode memory accesses). On the memory bus, the access length is determined according to the MDLN signals.

The numbering conventions for data units within a word for the preferred embodiment of the invention, are consistent with the RISC/SIP definitions set forth in the incorporated application describing a RISC processor. Bits are numbered in increasing order from right to left. Bytes and half words can be ordered either from right-to-left or from left-to-right, as controlled by the Byte Order bit of the Modb Register.

The preferred embodiment of the ICU contains the necessary hardware to fully support byte, half word and word accesses. The different data types should be aligned on their natural address boundaries. Accesses which are not on their natural boundary are reported on the Error and Status registers; but the access is serviced as if it was correctly aligned (i.e. the appropriate address bits are ignored).

For memory byte read operations on the processor bus, alignment hardware shifts the byte to the low order (rightmost) location within a word.

For memory half word read operations on the processor bus, alignment hardware shifts the half word to the low order (rightmost) location within a word.

In case of a miss on memory read operation, the ICU uses word accesses on the memory bus for the reload operation. Byte and half word accesses are used for non-cacheable read accesses. The byte or the half word are aligned before they are sent to the processor. The access length is transferred from the processor bus (OPT inputs) to the memory bus (MDLN signals).

For memory write operations the ICU writes bytes and half words in the appropriate cache locations. For a byte write, the byte is duplicated from the low order byte location to all other byte locations within a word. The appropriate byte write enable is activated in order to write the correct byte in the cache. For half word write, the half word is duplicated from the low order to the high order half word. Then, it is written into the cache by activating the appropriate byte enables.

For write-through and non-cacheable write accesses, the access length is transferred from the processor bus (OPT inputs) to the memory bus (MDLN signals). The duplicated bytes or half words are placed on the memory bus. The memory controller decodes the address and length, and activates the correct write enable signals.

It should be noted that although the ICU supports byte and half word accesses, the user can decide if the system will support them. If the decision is to support only word accesses, the OPT and MDLN inputs should always specify word accesses.

The portion of the detailed description to follow immediately hereinafter describes the ICU operation for the different cases of cache accesses on the processor and memory buses.

The processor bus accesses are either single, pipelined and burst mode accesses.

All the accesses on the processor bus are initiated by the processor. The ICU supports the three access protocols as defined in the copending applications Previously incorporated herein by reference.

Single accesses are used for single data read and write accesses as well as special instruction accesses.

Pipelined accesses are supported by the ICU. The ICU latches the address (*PEN should be driven by external logic). The processor can use the address bus for starting another ICU access. The address of a pipelined access is used by the ICU for the tag compare function, in pipeline with the previous access. In case of a cache hit, one cycle is required for the pipelined access to complete, after the primary access completes. In case of a cache miss, the memory bus access starts one cycle earlier.

Burst mode accesses are used for instruction accesses and multiple data accesses. In these accesses the address for the first word is transferred, and then sequential addresses are assumed for the following words. Burst mode read and write accesses are fully supported by the ICU. The maximum rate of one word per cycle is achieved for cache hits.

A single memory read access is used for reading data variables from a data cache. (The incorporated RISC processor performs all instruction reads using burst mode protocol.) The address is used for searching the cache for the required word. If the word is found (hit), the data is transferred to the processor and the *CRDY output asserted. Alignment is performed for byte and half word accesses. For single memory read accesses, the ICU responds in two cycles.

If the required word is not found in the cache (miss), the ICU initiates a predetermined miss handling procedure. The shared block status bit is updated on every miss. Also, the LRU bit associated with the set is updated on every access to reflect the least recently used block.

A burst mode memory read access is treated by the ICU as a series of sequential memory read accesses. In the first cycle of a burst mode read access, the address for the first word is transferred by the processor. When a burst mode read access is detected by the ICU, it latches the address and asserts the *CBACK signal. The address is compared and automatically incremented for every word in the burst. In the case of cache hit, the ICU responds with the first word in two cycles. An address can be incremented and compared in a maximum rate of once per cycle. This allows a reate of one cycle per word to be achieved in the case of cache hits. Note that the one cycle access is maintained also in the case of block boundary crossing.

If a miss is found at any point during the burst mode access, a predetermined burst miss handling procedure is initiated.

During the memory bus burst mode access, the next word address (current word address plus 1) is checked in the cache. If a hit is found during the memory bus burst mode operation, the memory bus access is terminated and the data transfer continues from the cache. The misses and hits cases and the transfers from one to the other are transparent to the processor (only the access time is affected).

A burst-mode read access can be terminated by the processor at any point of time by deasserting *BREQ. One more word is serviced as defined for the incorporated RISC processor's burst mode protocol.

A single memory write access is used for writing data variables to the cache. The address and the data are latched by the ICU in the first cycle of the access, and the *CRDY signal is asserted during this cycle (single cycle writes). Note that the *CRDY signal is asserted independently of the hit or miss conditions.

In the case of cache hit, the data is written in the cache in the second cycle. The write policy is determined according to the ASTC inputs, the Write Policy field of the Moda Register, the Write Shared Hit Control and Processor Shared Bit Control fields in the Modb Register, and the block status shared bit. There are three possible write policies: exclusive write-through, exclusive copy-back and shared.

For an exclusive write-through write access, the data is also written to the memory. If the write buffer is enabled, the data is written into the write buffer. When it is disabled, the write operation is not buffered as will be explained hereinafter with reference to the description of the write buffer. In both cases, the memory bus access is started when there are no other memory bus operations that should be performed earlier, and when the memory bus is available.

For an exclusive copy-back write access, the data is written only in the cache and the modified bit set. The data is written to the memory when the block is replaced.

For the case of a shared write access, a write-through or write-broadcast access is always performed on the memory bus. In this case, the Write Shared Hit Control field of the Modb Register and not the Write Policy field of the Moda Register controls the ICU operation.

In case of a cache miss, the ICU operation is determined according to Write Allocate bit of the Moda Register. If write allocate is enabled, a cache block is allocated for the missed block, and a miss procedure is initiated. The miss procedure is similar to the memory read miss procedure. After the miss procedure is completed, the cache operation continues as previously described for the write hit case.

If write allocate is disabled, a block is not allocated in the cache. The data is written only in the memory as described for the write-through operation. Note that for this case a copy-back write is treated as a write-through access.

The shared block status bit is updated on every miss. It can be also updated for cache hit, if the appropriate bit of the Modb Register is set.

The LRU bit associated with the set is updated on every access to reflect the least recently used block.

A burst mode memory write access is treated by the ICU as a series of sequential memory write accesses. In the first cycle of a burst mode write access, the address and data for the first word are transferred by the processor. When a burst mode write access is detected by the ICU, it latches the address and the data and asserts the *CRDY and the *CBACK signals. The address is compared and automatically incremented for every word in the burst.

In the case of cache hit, the ICU writes the first word into the cache during the second cycle. An address can be incremented and compared in a maximum rate of once per cycle. This allows a rate of one cycle per word to be achieved in the case of cache hits. Note that the one cycle access is maintained also in the case of block boundary crossing. A memory bus write operation may be started as well, in the same conditions as for single memory writes. If the write buffer is enabled it is used to buffer up to four writes. The memory bus access is burst mode write. The conditions for the memory bus operation are checked for every word in the burst, and the memory bus operation is affected accordingly.

If a miss is found at any point during the burst mode access, the ICU operation is determined according to the Write Allocate bit of the Moda Register. If write allocate is enabled, a cache block is allocated for the missed block and a miss handling procedure is initiated. The memory bus access is either read or read for modify depending if the Write Miss Memory access Control bit of the Modb Register is HIGH or LOW respectively. After the miss procedure is completed, the cache operation continues as described for the hit case. Note that in this case, each missed sub-block is first read into the cache and then written. The memory bus operation is not a continuous burst.

If write allocate is disabled, a block is not allocated in the cache. The data is written only in the memory using a burst mode write operation. The conditions for the memory bus operation are checked for every word in the burst, and the memory bus operation is affected accordingly.

The next word address (current word address plus 1) is checked in the cache for every word write. If a hit is found after one or more misses, the ICU continues as described for the case of hit. The misses and hits cases and the transfers from one to the other are transparent to the processor (only the access time is affected).

A burst mode write access can be terminated by the processor at any point of time by deasserting *BREQ. The ICU services the last word write and terminates the memory bus burst mode access, if necessary.

Next, a variety of other access procedures supported by the preferred embodiment of the invention, will be described.

A non-cacheable memory access is supported. It is used for bypassing the cache for special variable accesses. For this access, the cache is not searched for the required data. A memory access is started for reading or writing the data in memory. No block is allocated in the cache for this data.

Instruction ROM accesses may be optionally supported. These accesses are serviced by an instruction cache as a regular memory read access. In case of a miss the memory bus access is designated as a ROM access. The ICU can be programmed to ignore ROM accesses.

Input/Output accesses may be optionally supported and treated by a data cache as non-cacheable accesses. The ICU transfers the access to the memory bus with the I/O indication. The ICU can be programmed to ignore Input/Output accesses.

Coprocessor transfers are ignored by the data cache.

Also supported is a memory access which can be specified as an interlock access. This is done by setting the *LOCK input. An interlock access can be used to access semaphores and other synchronized shared variables. Interlock accesses are controlled by the Modb Register.

An Instruction memory access as Data is supported. This is a special data access used for reading and writing the contents of an instruction memory. It is indicated by a special code on the OPT inputs.

A Debug Module Access is also supported. This is a special data access used for accessing the RISC/SIP debug module. It is indicated by a special code on the OPT inputs. The ICU drives the *CRDY signal for this access. *CRDY is driven HIGH for four cycles, and then asserted for one cycle. This is done in order to enable the insertion of the debug module in the cache system, without affecting the processor's *RDY logic.

In addition to all the above, a Cache Instruction access is supported. This access is used for transferring processor bus cache instructions to the ICU.

Turning to Memory Bus accesses, it should be understood that the memory bus is used by both the ICU master cache and slave caches. The memory is accessed by an ICU bus master, by issuing a memory bus access. The ICU gets the bus mastership by asserting the *MBUSR (bus request) output and waiting for *MBGRT (bus grant). A ICU bus slave can monitor the memory bus accesses for cache consistency purposes. Cache instructions can be activated by special accesses on the memory bus.

Read accesses, write accesses and read for modify accesses will now be described as supported by the ICU.

A memory bus read access is initiated by a cache master for reload operation and for non-cacheable accesses. All reload operations use access length of words. For non-cacheable accesses, the access type and appropriate length are transferred from the processor bus to the MDLN, MREQT and *MLOCK memory bus signals. A burst mode access is used for the reload operation if more than one word is required. A single access is used in all other cases.

The reload operation is dependent on the original processor bus operation. It is different for the cases of single accesses and burst mode accesses.

For the case of cache miss on a processor bus single memory read operation, the starting and ending addresses, as well as address wrap around or no wrap around, are controlled by the Single Miss Control (SMC) and Sub-block Size (SBS) fields of the Moda Register.

For the case of a cache miss on a processor bus burst mode read access, a burst mode access is started on the memory bus, for the reload operation. The reload starting address is always the one of the missed word. The burst end address is controlled by the Moda Register.

When the ICU is the bus master, and it issues a read request for reload operation, the *VSI input has a special function. If it is asserted before the transaction is completed (the last *MRDY has not been accepted), then the BSTC signals are latched, and a special Write Block Status instruction is executed.

The operation of a slave cache for memory bus read accesses is described with reference to ICU multiprocessor support, to be set forth hereinafter.

Turning to write accesses. A write operation is initiated by the cache master for write-through and non-cacheable write accesses, modified block copy-back to memory, and shared block write hit operations. A burst mode access is initiated for the modified block copy-back operation, and for burst mode write accesses on the processor bus. A single access is initiated in all the other cases. For single accesses, the access type and length are transferred from the processor bus to the MDLN, MREQT and *MLOCK memory bus signals.

A burst mode write access on the memory bus starts at the required initial word address and stopped at the last word which is required to be written to the memory. It is not affected by the Moda options as in the case of burst mode read accesses.

In the case of a hit to a shared block, a write-through operation is initiated under control of the Modb register depending on the value of the register's write shared hit control field.

The operation of a salve cache for memory bus write accesses is also described hereinafter with reference to ICU multiprocessor support.

A read for modify is a special read operation. It is used by the ICU in the case of a miss on a copy-back write operation, under control of the Modb register. The master cache indicates that the block is going to be modified after the read is completed. In all other respects the master operation is similar to the read access.

When the ICU is the bus master, and it issues a read for modify request for reload operation, the *VSI input has a special function. If it is asserted before the transaction is completed (the last *MRDY has not been accepted), then the BSTC signals are latched, and a special Write Block Status instruction is executed.

The operation of a slave cache for memory bus read for modify accesses is also described hereinafter with reference to ICU multiprocessor support.

Two more operations are supported by the preferred embodiment of the ICU, a Write Broadcast operation and a Memory Bus Cache Instruction access.

A write broadcast operation is initiated by the ICU only in the case of a write hit to a shared block, under Modb Register control. The difference between a write broadcast and a regular write is that in write broadcast the memory is not updated. In all other respects the operation is similar to the write access.

A memory bus cache instruction access may be initiated on the memory bus by external logic. When the ICU is not the bus master, the assertion of *VSI causes a cache instruction transaction on the memory bus. During the first cycle of the transaction, the MWR, MREQT, BSTC signals, and the address are latched. The MWR and MREQT signals specify the instruction. The BSTC signals specify the block status for the relevant instructions. The address is used as the address operand for the relevant instruction. If the instruction requires data operand, the data is latched during the second cycle.

The preferred embodiment of the ICU follows the following priority rules with respect to the different cache accesses:

1. All accesses are serviced on a first come first serve basis.
2. A second access may be started in pipeline while the first completes. The tag and memory arrays can service a different access every cycle.
3. If two accesses, one on the processor bus and one on the memory bus, require a tag array access at the same time, the processor bus access has the priority only if it is a primary (not pipelined or continued burst) memory access. The memory bus access has the priority in all other cases.
4. The responses to the processor bus accesses are always in the order that they were received. If a pipelined or burst continuation access hit in the cache, the response is delayed until the primary access completes. Note that the pipelined or burst continuation can complete after the response of the primary access has been sent but before it was fully completed. This happens for primary write accesses before the write is executed on the memory bus, for reload operation after the required data has been sent to the processor and in some of the special instructions execution.

It should now be clear to those skilled in the art that the ICU's special registers can accommodate programmable option selection and status reporting. Cache policies can be selected by using programmable options. The cache write policy can be programmed as write-through, copy-back or flexible on a per access basis. A write allocate or non-write allocate option can be selected. The replacement algorithm can be programmed as LRU, random or external. A flexible prefetch policy can be selected. Read through option can be enabled. A four word read buffer is incorporated to support efficient prefetching and read operations.

The option bits, as indicated hereinbefore, are defined for options selection and stored in the Moda register.

As previously indicated, by comparison with the preload instruction, a prefetch operation is defined as the fetching of a variable or an instruction before it is required. The ICU includes the hardware to support several programmable prefetch options. It also includes a memory read buffer which is used as a prefetch buffer. Prefetched words can be saved in the prefetch buffer if the cache array is not available for the update. Each of the following prefetch options can be used independently or in any combination.

The simplest form of prefetching can be achieved by using a sub-block size larger than one word. The ICU reloads the sub-block in the case of a miss. The words in the same sub-block of the required word are prefetched.

The Moda Register controls the operation of the ICU for single access miss.

The Moda register also controls the ICU operation for a miss on a burst mode access. If the burst is suspended by the processor, the cache can prefetch more words before stopping the memory bus burst. In this case the prefetch can proceed up to the end of the same sub-block or the next sub-block.

The Moda register also enables the prefetch option for single access cache hits and burst access cache hits.

In addition to prefetch, a reload operation is defined and under the control of the programmable Moda register.

The reload operation is dependent on the original processor bus operation. It is different for the cases of single accesses and burst mode accesses.

For the case of cache miss on a processor bus single memory read operation, the starting and ending addresses as well as address wrap around or no wrap around are controlled by the Moda register.

For the case of a cache miss on a processor bus burst mode read access, a burst mode access is started on the memory bus, for the reload operation. The reload starting address is always the one of the missed word. The burst end address is also controlled by the Moda register.

Next, before turning to the detailed description of how the ICU supports multiprocessor operations, the ICU write buffer and ICU initialization and reset criteria will be set forth.

The ICU incorporates a 4 location write buffer. It can buffer up to four write accesses (address, control and data). The write buffer can be disabled by setting a bit in the Moda register.

When enabled, the write buffer is used for buffering write accesses on the memory bus. For write-through and write broadcast accesses, four individual write accesses can be buffered. The writes wait in the write buffer until the bus is available. This can improve the performance significantly for a write-through cache, or if there are many write broadcast operations.

The write buffer is also used for buffering a modified block before it is written to the memory. In the case of a miss, if a modified block is chosen for replacement, it is placed in the write buffer. The read for the missed sub-block is started before the write. This feature enables the ICU to respond faster to the processor request.

When the write-buffer is full, the ICU can still service one more cache access as long as the memory bus is not required (read hit or copy back write hit). If the memory bus is required for another write operation, the cache holds until there is one available space in the write buffer for the write. All other requests are serviced only after the write buffer is empty. This is required in order to guarantee correct sequencing of requests, i.e. a miss on memory read waits until all the writes are executed, in order to read an updated memory.

When the write buffer is disabled no write accesses are buffered. The write operation on the memory bus is started as soon as the bus is available. The ICU can still service one more cache access as long as the memory bus is not required (read hit or copy back write hit). If the memory bus is required, the cache holds until the previous write operation is completed.

As for initialization, the ICU must be initialized when power is first applied. It can be also initialized at some later point in time, when required.

There are two methods to initialize the ICU, assert the *RESET input or issue a Reset instruction. The two methods have exactly the same effect on the ICU. A special initialization sequence is performed, according to the preferred embodiment of the invention, as follows:

1. Any, in progress, cache operation or cache instruction is suspended.
2. Any memory bus operation is suspended.
3. Chip Select disable and chip select for memory access enable bits, stored in the Chip Select Mapping Register, are reset.
4. Bits indicating instruction and operand validity, stored in the Instruction Register, are reset.
5. A bit indicating instruction count validity, stored in the Count Register, is reset.
6. The parity error, memory error, illegal instruction and protection violation bits of the Status Register are reset.
7. All the Moda register bits except for Read Only Memory Enable (ROME) and the bit indicating whether the cache is an instruction or data cache (ID bit) are reset.
8. All the Modb register bits are reset.
9. All the valid bits are reset.

The following conditions should be kept for a proper reset operation:

1. The *IREQ input of all ICU data caches in the system should be connected to LOW level. The *IREQ of all instruction caches should be connected to the *IREQ output of the processor.
2. The DREQT1 of only one instruction cache should be connected to High level, if the Reset ROM is placed on the memory bus. All DREQT1 should be connected to LOW level if the Reset ROM is placed on the processor bus.
3. The Chip Select Mapping Register of different ICUs should be programmed to respond to different addresses for memory accesses and cache instruction accesses. This can be done by using the *CSEL input. A simple configuration that does not require external hardware is possible. The *CSEL input of different caches can be connected to different address bits and use the appropriate addresses. After the initial register programming is completed, the *CSEL input can be disabled.
4. The programming of the ICU registers should be the first sequence of operations after Reset. No memory (except from instruction ROM accesses), I/O or coprocessor accesses should be performed before the ICUs are configured according to the specific system.
5. If a data transfer controller (DTC) as described in the incorporated copending application related to the DTC, is present in the system, the Modb register should be programmed before any DTC access is performed. If the DTC is placed on the processor bus, it should be programmed to respond to I/O addresses (the ICUs should be programmed to ignore I/O accesses).

Turning now to the multiprocessor support features of the ICU.

The main problem, from a cache point of view, of multiprocessor organizations is the data consistency problem. This problem occurs if more than one cache contain a copy of the same memory location, and it is modified in one of the caches by its processor. The other caches then contain staled (not updated) copy of the data. The novel ICU architecture addresses these problems. It will be recognized by those skilled in the art that the multiprocessor support constructs incorporated in the novel ICU can be applied in other multiprocessor cache environments as well.

The basic philosophy behind ICU multiprocessor support is to include extensive features in order to enable a high performance and high efficiency multiprocessor cache system. The features include enough flexibility so that the ICU imposes minimal restrictions on the multiprocessor system organization. The selection of the appropriate way to use the multiprocessor support features is simple. It is done under software control by programming option bits in the on chip special registers.

Figure 4:
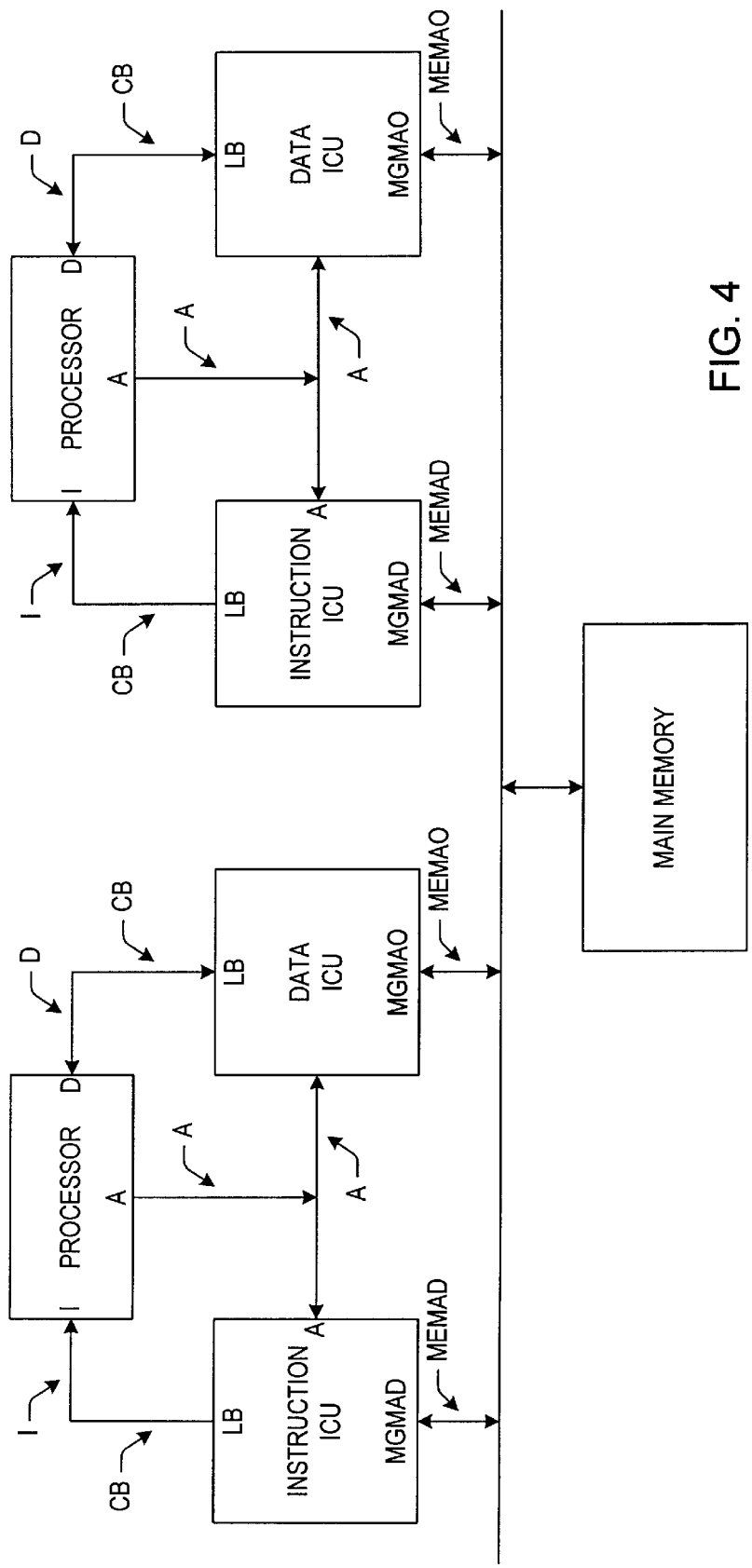
FIG. 4 depicts a simplified shared bus multiprocessor system with two ICUs per processor, one used as an instruction cache, the other used as a data cache.

Reference should now be made to FIG. 4.

A typical simplified shared bus multiprocessor system diagram is shown in FIG. 4. Two or more processor clusters can share the same memory bus (two are shown in the figure). Each processor cluster consists of one processor and two ICUs. One ICU is used for instruction cache and the other for data cache. The processor address bus (A) is shown connected to the address bus of the two ICUs (A). The processor instruction bus (I) is connected to the cache bus (CB) of the instruction cache. The processor data bus (D) is connected to the cache bus (CB) of the data cache. The memory bus (MEMAD) of the ICUs are both connected to the shared memory bus. Many variations of this basic diagram are possible without departing from the scope or spirit of the invention.

It should be recalled that, according to the preferred embodiment of the invention, two block status bits and four valid bits are associated with each cache block. The valid bits indicate the validity of the words in the block. Each valid bit corresponds to one word. If at least one valid bit is set then the block is valid and the block status bits indicated a valid status. If all the valid bits are reset, the block is in a non-valid status, arid the block status bits are irrelevant. The block status bits are named shared and modified bits. The shared bit indicates if the block is share by more than one processor, or present in more than one cache. The modified bit indicates if the block is modified relative to the main memory. The two bits are independent and a valid block can be assigned with the following statuses:

| Block status bits value (shared, modified) | Meaning |
| --- | --- |
| 00 | Exclusive non modified |
| 01 | Exclusive modified |
| 10 | Shared non modified |
| 11 | Shared modified |

It should also be recalled that non-cacheable data is a data variable which is not cached. A non-cacheable processor bus access is indicated to the ICU, ASTC inputs. For this access, the cache is not searched for the required data. A memory access is started for reading or writing the data in memory. No block is allocated in the cache for this data. Non-cacheable data can be assigned on an access by access basis. Usually, the ASTC inputs are connected to the MMU programmable (MPGM) outputs of the processor. In this case, the non-cacheable data is assigned on a MMU page basis. The non-cacheable data should be placed in a location assigned by the system as non-cacheable. One way to solve the data consistency problem is to assign shared variables as non-cacheable.

A processor bus memory access can also be specified as an interlock access. This is done by setting the ICU *LOCK input. Interlock accesses are controlled by the Modb Register and can be designated as cacaheable or non-cacheable accesses.

In a multiprocessor environment, interlock variables can be used for synchronization, and synchronized communication. These variables are accessed in a synchronized way. They can be written by only one processor at an y given time. A detailed description of the ICU support for interlock accesses will be set forth hereinafter.

The ICU supports flexible write-through and copy-back write policies. These write policies can be assigned either globally or on an access by access basis. The Moda Register controls the global write policy. It can specify the flexible write-through or copy-back policy. The ASTC inputs define the write policy on an access by access basis.

The access can be assigned as an exclusive write-through, exclusive copy-back, or shared. In the case of a cache hit, if there is a conflict between the ASTC inputs shared bit assignment and the block status shared bit in the cache, the write operation is controlled by the value on a Processor Shared Bit Control (PSBC) in the Modb Register. If PSBC is 0, the block status shared bit is not affected and the write policy is determined according to the block status. If PSBC is 1, the block status shared bit is assigned according to the ASTC inputs and the write policy is determined accordingly.

For the case of a shared write access, a write-through or write-broadcast access is always performed on the memory bus. In this case, a Write Shared Hit Control (WSHC) field in the Modb Register, and not the write policy field, controls the ICU operation.

In a multiprocessor cache environment, the write-through policy has less problems than the copy-back policy. If write-through is used, the memory always contains an updated version of the data. The write-through access can be also used by other caches to invalidate their own copy.

The processor bus cache instructions can be used by the system for controlling the cache in a multiprocessor environment. Invalidate instructions can be used to invalidate stale data. Other instructions can be used in more complex software controlled multiprocessor caches for reading and writing block status, memory updates, and sending cached data on the memory bus.

A further multiprocessor support feature of the ICU is "bus watching". The novel ICU is capable of watching the memory bus addresses, and checking if they match an address in the tag array. This is done transparently to the processor bus cache accesses. The Read Bus Watch Enable information in the Modb register, controls (enables or disables) the bus watching capability for memory bus read accesses. The Write Bus Watch Enable information in the Modb register does the same thing for memory bus write accesses. When enabled, the bus is watched only when the ICU is the bus slave. In the case of an address match, the ICU performs operations as controlled by the Read Match Control and Write Match Control information in the Modb register.

In the case of a match on memory bus read, the *HIT signal is asserted by the ICU. The shared block status bit is set since the block is potentially fetched by another cache. The Modb Register controls the data intervention operation and the block status modified bit assignment. The options are no data intervention, data intervention (modified bit unchanged) and data intervention (modified bit reset).

When data intervention is disabled, in the case of a match on memory bus read by another master, the ICU asserts the *HIT signal, but does not drive the data. The block status modified information is not changed. When data intervention is enabled, if a match is found for a memory bus read by another master and the block is modified, then the ICU asserts the *DI output and supplies the required data on the memory bus. The block status modified bit is either not changed or reset.

In the case of a match on a read-for-modify access, the corresponding word is invalidated by the slave caches. In all other respects the slave cache operation is similar to the case of a match on regular read access.

For memory bus burst mode accesses the initial address is latched. The address is incremented and checked in the slave cache for every single transfer. The slave cache operation in case of a match is similar to the single access match.

The bus watching for read is essential in the support of the data consistency ownership schemes to be described in detail hereinafter.

The data intervention option is required by some of the ownership schemes. For those schemes, the memory should be designed to support it. The *DI signal is pre-charged by the master cache during the first cycle of the access. An external pull-up resistor should be placed on the *DI signal in order to hold the precharged HIGH value. The *DI signal is discharged by the slave caches if/data intervention operation is performed. In this case, the data should not be supplied by the memory, and the read access should be cancelled in the memory. Note that the *DI output is valid two cycles after the address is presented on the memory bus. The memory cannot respond during these cycles.

In the case of a match on a memory bus write or write broadcast, the *HIT signal is asserted.

For burst mode write accesses the initial address is latched. The address is incremented and checked in the slave cache for every single data transfer. The slave cache operation in case of a match is similar to the single access match.

The bus watching for write is essential in the support of most of the data consistency schemes.

A description of how block status shared bits are assigned will now be set forth.

The block status shared bit can be assigned by either software or hardware control. For software control, the processor can assign the shared bit by using the ASTC inputs. These inputs define the shared bit assignment on an access by access basis. The access can be assigned as an exclusive write-through, exclusive copy-back, or shared. Usually the ASTC inputs are connected to the processor MPGM signals, which are driven according to the MMU user programmable bits. The shared and exclusive variables are placed in shared or exclusive pages, and the user programmable bits for the pages are assigned accordingly. Depending on the state of the PSBC bit of the Modb register (referred to hereinbefore), the shared bit can be modified for every processor access (PSBC=1), or only for the case of cache miss (PSBC=0).

For hardware control the shared bit can be assigned by using the *HIT signal, or by using special purpose logic on the memory bus and the Write Block Status memory bus cache instruction. The *HIT signal usage in read and write accesses is controlled by an External Shared Bit Control (ESBC) field of the Modb Register.

In the case that a master cache uses the *HIT signal, it precharges it during the first cycle of the memory bus access. Then, the *HIT signal is placed in three state. An External pull-up resistor should be placed on the *HIT signal, in order to hold the precharged HIGH value. The slave caches discharges it if they find a match in their tag buffer. The *HIT signal is latched by the master cache when *MRDY is asserted or two cycles after the memory bus address cycle, whichever is later. If the *HIT is asserted, then, the variable is also present in other caches, and the block is assigned with a shared status. If the *HIT input is not asserted, the variable is not present in any cache, and the block is assigned with an exclusive status.

This method is used in some of the ownership schemes. It guarantees that the shared status reflects the exact state of the variable. It is shared only if it is present in another cache. Note that there is a performance price associated with the use of the *HIT signal. The ICU has to wait for two cycles until all other caches respond. A special internal cache array access is also required if the shared bit must be modified. This should be considered against the advantages, before choosing this option.

The Write Block Status memory bus cache instruction, described hereinbefore, can be used for writing a specific status to the block status shared bit. This instruction can be used by external logic for a flexible control of the shared bit.

In the case of a conflict on the shared block assignment between the above three methods, the operation will be performed, in the preferred embodiment of the invention, according to the following priority:

1. Write Block Status instruction.
2. *HIT input control.
3. ASTC inputs control.

For example, if the block is assigned as exclusive by the ASTC inputs, but a memory bus access is required. The *HIT input usage is enabled and it indicates that the block is exclusive. The Write Block Status instruction is also used during the memory access and assign a shared status. The block ends up in the shared status.

The different methods of shared block assignments, and their combinations, are used for the implementation of all the multiprocessor cache systems supported by the novel ICU.

Next, ICU operation when a write hit occurs to a shared block will be described.

When a write access is directed to a shared block and it hits in the cache, a special operation should be performed on the memory bus. The other caches in the system should be aware of the fact that a shared data variable has been modified. Their copy should be either invalidated or updated to reflect the current version of the shared variable. The main memory can be either written or not. The block status of the master cache is affected accordingly. The ICU operation on a write hit to a shared block is controlled by a Write Shared Hit Control (WSHC) field in the Modb register. One encoding scheme is as follows:

| WSHC value | Master cache operation | Slave cache operation | New block status |
|---|---|---|---|
| 00 | Write through | invalidate | exclusive unmodified |
| 01 | Write broadcast | invalidate | exclusive modified |
| 10 | Write through | update | shared unmodified |
| 11 | Write broadcast | update | shared modified |

When WSHC=00, the ICU writes through any write hit to a shared block. The memory is updated and other caches are invalidated. The block is assigned with the exclusive unmodified status. Since the block becomes exclusive, further writes to the same block can be written only in the cache. This scheme is effective if a shared variable is written many times by one processor before needed by other processors.

When WSHC=01, the ICU uses a write boradcast transaction on the memory bus. The memory is not updated and other caches are invalidated. The block is assigned with the exclusive modified status. Since the block becomes exclusive, further writes to the same block can be written only in the cache. Since the memory is not updated the modified bit is set. The data intervention option should be enabled in order to supply the most current value, when another master tries to read this block.

When WSHC=10, the ICU writes through any write hit to a shared block. The memory is updated and other caches are also updated. If the ESBC is not enabled for write accesses, the block is assigned the shared unmodified status. If the ESBC is enabled for write accesses, the block is assigned the exclusive unmodified or shared unmodified status, according to the *HIT input. In this scheme all the caches are kept synchronized, in the expense of memory bus write transaction for each write to a shared block. It is effective if a shared variable is not written many times by one processor before needed by other processors.

When WSHC=11, the ICU broadcast writes any write hit to a shared block. The memory is not updated and other caches are updated. If the ESBC is not enabled for write accesses, the block is assigned the shared modified status. If the ESBC is enabled for write accesses, the block is assigned the exclusive modified or shared modified status, according to the *HIT input. In this scheme all the caches are kept synchronized, in the expense of memory bus write transaction for each write to a shared block. It is effective if a shared variable is not written many times by one processor before needed by other processors. Since the memory is not updated the modified bit is set. The data intervention option should be enabled in order to supply the most current value, when another master tries to read this block.

The WSHC options are used for the different ownership schemes. They can be also used for other multiprocessor cache systems.

The ICU memory bus operation for a copy-back write miss with write allocate is controlled by a Write Miss Memory access Control (WMMC) bit on the Modb register. It has no effect on write-through accesses or copy-back accesses with no write allocate. When WMMC=1, the ICU uses a read access on the memory bus for fetching the required sub-block, followed by cache write access. This access is treated as a separate cache write operation. It always hits and is written into the cache. If the block is shared, a memory bus operation is performed according to the WSHC field of the Modb register. When WMMC=0, the Read for Modify transaction is used on the memory bus for fetching the required sub-block. Slave caches invalidate their copy of the block, in case of a match. The write is perfomed in the cache without any memory bus operation.

The WMMC options are used for the different ownership schemes. They can be also used for other multiprocessor cache systems.

The memory bus cache instructions are issued by special logic on the memory bus. They allow flexible control of the cache. Cached data can be invalidated, read, and written. The block status can be read and written. A detailed description of the memory bus cache instructions has been set forth hereinbefore.

In the multiprocessor environment, the special control logic should be able to direct the instruction to the appropriate ICU. The logic can be designed for any required multiprocessor system. Specifically, it is required to use this method, for systems without one shared bus (cross-bar switch or multi-bus configurations). In these systems the bus watching facility is not effective, and special logic should monitor the memory accesses and issue commands to the different ICUs in the system accordingly. The control logic can be also designed to implement a specific multiprocessor scheme which is not directly supported by the ICU.

There are many possibilities for multiprocessor cache organizations. The ICU is designed to support various shared memory multiprocessor cache organizations. The ICU can be also used in a non-shared-memory organization, but it does not include special hardware support for these systems. The detailed description to follow sets forth the main shared-memory organizations which are supported by the ICU. Variations, combinations and different systems than the described systems are also possible.

The main shared-memory organizations supported are: software controlled caches, write-through caches, copy-back caches with write-through shared variables, ownership schemes and shared memory with non-shared bus organizations.

For software controlled caches, all the multiprocessor communications and synchronizations are done under software control. The cache consistency is maintained by software. This can be done by using a combination of non-cacheable variables, interlock operations (to be described in detail hereinafter), and the use of cache instructions (e.g., invalidate). Shared variables can be either assigned as non-cacheable or invalidated from the appropriate caches when they can be modified by another processor. Interlock operations are used for synchronization. Shared buffers, or mailboxes are used for communication.

This is a very flexible scheme with no special hardware requirements or restrictions. It can be used successfully in systems with small amounts of sharing. However, if the amount of sharing is high, the system performance can be severely degraded in this scheme. Many variables cannot be cached, or big overhead is imposed on cache consistency maintenance. Another disadvantage of this scheme is that the cache is not transparent to the software, and the information about which variables are shared must be known. Software control can be used in combination with any of the other multiprocessor schemes.

There are no special programmable options requirements for this configuration. The Modb register can be programmed to 0.

For write-through caches, the processors share the same bus and memory, and all the caches use the write-through policy. A master cache transfers every processor write operation to the memory bus. The cache consistency is maintained by using bus watching for writes. Every write operation on the shared memory bus is checked in all the slave caches. If a match is found the corresponding address is invalidated. This is a simple data consistency scheme. Its main disadvantage is that every write cause a memory bus operation. The performance can be severely degraded because of it. The memory bus utilization can be much higher so that only a small number of processors can be placed in the system. The write buffer can help to reduce these bad effects.

For this option, all the blocks should be assigned as exclusive write-through, the write policy should be programmed as write-through, bus watching should be enabled for write accesses, and the Modb register should specify invalidate word.

For copy-back caches with write-through shared variables, the processors share the same bus and memory, and the caches use a flexible write policy: The exclusive variables use a copy-back option (placed in a page assigned as exclusive copy-back). It is the system responsibility to insure that only the variables that are used exclusively by one processor are assigned as exclusive copy-back. Note that if process migration is permitted, an exclusive variable must be invalidated in the old processor's cache.

The shared variables use a write-through option (placed in a page assigned as exclusive write-through). It is the system responsibility to assign this status to any variable that might be shared (including sharing with I/O, or processors with no cache). Some variables, like I/O, must still be assigned as non-cacheable. A bus watching for writes scheme (similar to the one for the write-through caches) is used for maintaining data consistency. Slave caches invalidate their copy in the case of match. A possible variation with a better performance is that the slave caches update their copy instead of invalidating it.

This scheme is based on the assumption that all the shared variables are known and placed in a write-through or shared pages. If this is the case, a better performance compared to the write-through scheme can be achieved. However, if the amount of sharing is high, the disadvantages of the write-through operations of the shared data become more significant, and the performance degrades.

Except for the shared and exclusive variable assignments, bus watching should be enabled for write accesses and the Modb register should specify invalidate word. If the slave cache update variation is desired the Modb register should be programmed accordingly.

Turning to ownership schemes. These schemes are based on shared memory and shared bus organizations with bus watching for maintaining data consistency. The basic principle of the ownership schemes is that a variable is owned by only one cache. The owning cache contains the most up to date version of the variable, and it is responsible for maintaining its consistency. If a variable is not owned by any cache, then, the memory contains an updated value. In all the ownership schemes, a varaible can be in one of several (maximum 5) states in a cache. The five possible states (block statuses) supported by the preferred embodiment of the ICU are:

1. Exclusive write-through
2. Exclusive copy-back
3. Shared unmodified
4. Shared modified
5. Not valid Each ownership scheme is supported by a hardware implemented state machine which controls the state transitions. The different ownership schemes require different operations in the cases of read match, write match, write hit, and write miss. Different amounts of hardware support in the caches and in the system in general are required accordingly.

None of the ownership schemes require software control of the cache. They allow higher performance at the expense of more complicated hardware requirements.

There are six ownership schemes well known to those skilled in the art. They are:

1. Write Once
2. Berkeley
3. Illinois
4. Firefly
5. Dragon
6. Futurebus

One more scheme, known as the Synapse scheme, is very similar to the Write Once scheme, but it relies on a single bit tag which is included in the main memory for each cache block. This scheme is not directly supported by the ICU; however it can be implemented by using the Write Once options and some external logic.

Although the details of the various ownership schemes are well known and taught in printed publications, a short description of the main features of each scheme will be set forth for the sake of completeness and to facilitate the explanation of how these schemes are supported by the ICU.

The ICU directly supports all the above ownership schemes, and possibly other schemes that may evolve. This is achieved by selecting the required programmable options. In all the ownership schemes the write policy is programmed as flexible. Most of the write accesses can use a copy-back policy. Bus watching is enabled for both read and write. The Modb register with the various control fields defined hereinbefore, may be used to implement the various ownership schemes.

In the Write Once scheme, only the exclusive unmodified, exclusive modified, shared unmodified, and invalid states are defined. The shared modified state is not used. The basic principle of this scheme is that every write which hits in the cache the first time (write to a shared page) causes a write-through operation. Then, the block is assigned as exclusive modified, and further writes can be performed only in the cache. The slave caches invalidate their own copy of the block. A copy-back write to an exclusive block sets the modified bit. An exclusive modified block is owned by the cache, and data intervention is used in the case that another cache tries to read it (the memory is also updated and the block is then assigned as shared unmodified). For this scheme, all processor accesses should be assigned as shared. Note that an exlcusive block status overrides the shared indication by the ASTC inputs.

In the Berkeley scheme, only the exclusive modified, shared unmodified, shared modified, and invalid states are defined. The exclusive unmodified state is not used. A cache that contains the exclusive modified or shared modified block is its owner. In the case of a miss on read, the block is assigned as shared unmodified. In the case of write hit to a shared block a write broadcast operation is performed and the block is assigned as exclusive modified. Other caches invalidate their own copy of the block. Data intervention is performed by the owner in the case of read match. For this scheme, all processor accesses should be assigned as shared.

In the Illinois scheme, only the exclusive unmodified, exclusive modified, shared unmodified, and invalid states are defined. The shared modified state is not used. A cache that contains the exclusive modified block is its owner. In the case of a miss on read, the block is assigned as shared unmodified or exclusive unmodified depending on the *HIT input. in the case of write hit to a shared block a write broadcast operation is performed and the block is assigned as exclusive modified. Other caches invalidate their own copy of the block. Data intervention is perfomed by the owner in the case of read match. Note that the data intervention operation is different from the original Illinois scheme definition, however the end results are the same. In the original definition, all caches that contain a copy of the required data try to intervene. In our case, data intervention is performed only if the block is modified. If the block is shared unmodified the data is supplied from the memory. For this scheme, processor accesses shared bit assignment is irrelevant, since the *HIT signal is used for this purpose.

In the Firefly scheme, only the exclusive unmodified, exclusive modified, shared unmodified, and invalid states are defined. The shared modified state is not used. A cache that contains the exclusive modified block is its owner. In the case of a miss on read, the block is assigned as shared unmodified or exclusive unmodified depending on the *HIT input. In the case of write hit to a shared block a write-through operation is performed and the block is assigned as shared unmodified or exclusive unmodified according to the *HIT input. Other caches update their own data in the memory array. Data intervention is performed by the owner in the case of read match. Note that the data intervention operation is different from the original Firefly scheme definition, however the end results are the same. In the original definition, all caches that contain a copy of the required data try to intervene. In our case, data intervention is performed only if the block is modified. If the block is shared unmodified the data is supplied from the memory. For this scheme, processor accesses shared bit assignment is irrelevant, since the *HIT signal is used for this purpose.

In the Dragon scheme, all the five block statuses are used. A cache that contains the exclusive modified or shared modified block is its owner. In the case of a miss on read, the block is assigned as shared unmodified or exclusive unmodified depending on the *HIT input. In the case of write hit to a shared block a write-broadcast operation is performed (the memory is not updated) and the block is assigned as shared unmodified or exclusive unmodified according to the *HIT input. Other caches update their own copy of the data. Data intervention is performed by the owner in the case of read match. For this scheme, processor accesses shared bit assignment is irrelevant, since the *HIT signal is used for this purpose.

In the Futurebus scheme, all the five block statuses are used. This scheme is a flexible scheme that allows the implementation of all the other ownership schemes (with some slight modificaions). The cache operation for the cases of read and write matches as well as write hit and read and write miss, are defined with enough flexibility for the different ownership schemes implementations. The use of the *HIT signal is also optional. The Futurebus scheme is fully supported by the ICU's flexibility. The ICU includes more flexibility than required by the Futurebus scheme so that some of the limitations, like memory update on data intervention and write broadcast support, are removed. For this scheme, processor accesses shared bit assignment can be performed either by software assignments or using the *HIT signal.

Turning, finally, to shared memory with no shared bus organizations. First, it should be noted that the bus watching capability is useful only in a shared bus multiprocessor organization. Other shared memory organizations which include multiple buses or a cross-bar switch, are also supported by the ICU. These organizations are required when the shared bus becomes a bottleneck in the system. In this case, they enable a larger number of processors and better performance.

The basic support for these organizations is the memory bus cache instructions. A detailed description of the memory bus cache instructions has been set forth hereinbefore. External control logic is required for monitoring memory accesses and issuing the cache instructions to the appropriate ICU. This logic may be designed according to the specific system organization. It should be capable of monitoring all main memory accesses (this function can be placed in the memory controller). Then, according to global information, a memory bus cache instruction can be directed to the appropriate cache. The details of such an implementation are system dependent, not a part of the invention, and many variations are possible. In order to illustrate the ICU support for these organizations some basic functions will now be described.

When one cache tries to read a block from the memory, the control logic can use the Write Block Status instruction in order to designate the block as shared or exclusive. If the updated version of the required variable is not present in the memory but in one of the caches, the Send Word, Send Word If Modified, or Send Block if Modified can be used in order to receive the updated version.

When a shared variable which is present in some of the caches is written by one of the processors, the ICU can be programmed to either write-through or write-broadcast the write information. An Invalidate Word, Invalidate Block, or Write In Cache instruction can be used in order to invalidate or update the copy of the other caches.

The block status of any cache block can be read or written whenever necessary by using the Read Block Status and Write Block Status instruction. This can be done by the control logic, in order to gather information on caches contents or specify block statuses.

Some of the programmable options can be also used for these organizations, in order to specify the ICU operation in the cases of shared hit, read and write miss. The bus watching can be used if the special logic is designed to issue read and write operations on the ICU memory bus, instead of memory bus cache instructions.

In a multi-bus organization, a combination of the bus watching and the memory bus cache instruction can be used. Bus watching can cover the data consistency of the caches that share the same bus. Special logic is required to transfer the relevant accesses or issue memory bus instruction to the appropriate caches, for inter bus data consistency, i.e., an operation on one bus which affects data in a cache placed on another bus. The design of the special logic is well within the capability of those skilled in the art and outside the scope of the instant invention.

In order to complete the description of the novel ICU, its interlock facility will be described in detail. First, however, more generally than in the ICU context, one skilled in the art will appreciate that interlock variables are used for semaphores and other synchronization variables in a multiprocessor or multitasking environment. Synchronization variables can be also used as a protection key for a shared memory area. The accesses to the interlock variables should be synchronized. Only one processor should be allowed to access interlock variables at any given time. Any read of an interlock variable should return the most up-to-date value of the variable.

In order to support interlock variable accesses, the processor should include some type of atomic read-modify-write operation. This allows checking and affecting a variable by a processor in an atomic way, while no other processor can interfere. In a system which includes cache memories, the interlock variables create a special problem, since their access should be synchronized independently of the cache.

A simple solution to this problem is to assign all the interlock variables as non-cacheable. In this case, the interlock variables are not allowed to be cached, and all interlock accesses are directed to the memory. This method is used in most of the known cache systems. The main disadvantage is the lower performance, and the higher bus utilization, caused by the interlock variables accesses to the memory. As the number of interlock accesses grows, the impact on the performance can become severe.

The novel ICU and indeed the interlock facility to be described hereinafter which is novel in its own right, allows for the caching of interlock variables. This allows a better performance and lower bus utilization to be achieved. Most of the interlock variable accesses are faster and do not appear on the memory bus, since the access is done only in the cache. The scheme is simple and can be implemented on the single chip ICU.

There are several ways to guarantee the synchronization associated with interlock variables. The processor associated with the illustrative embodiment of the invention includes the basic operations required for efficient interlocking. These are described in detail in the incorporated, processor related copending application, and specifically are the LOADSET, LOADL and STOREL instructions, the LK bit in the Current Processor Status Register, and the *LOCK output. The ICU implements two schemes for handling interlock variables. The desired scheme can be selected by programming the Cache Interlock Enable (CILE) bit of the Modb register.

When the CILE bit is LOW, caching interlock variables is disabled. Interlock accesses (*LOCK bit asserted) are treated as non-cacheable accesses. The cache is not searched for a hit and the access is transferred with the lock indication (*MLOCK asserted) to the memory bus. In this option the interlock variable handling is under the memory control. The memory should disable any access to the interlock variable while the *MLOCK signal is asserted. A LOADSET instruction can be used for testing and setting the interlock variable in the memory.

When the CILE bit is HIGH, the facility for caching interlocked variables is enabled. This is a special facility, built into the ICU to enable more efficient handling of interlock variables. It is compatible with the processor and takes advantage of the processor's different interlock basic operations.

The interlocked read and write operations (*LOCK is asserted) are treated in a special way. An interlocked read (generated by the processor for the LOADL and LOADSET instructions), is treated as a miss, unless it hits in a shared block. A reload operation is started on the memory address bus with *MLOCK asserted. The read data is stored in the cache and the block assigned as shared. For a shared block hit, the data is supplied by the cache with no memory address bus access.

An interlocked write operation is treated differently for the processor STOREL than the write of the LOADSET instructions. The ICU can distinguish between the two types of, interlock writes according to the state of the *LOCK input in the cycle preceding the write access. If the *LOCK bit was set, it means that the interlock write is the write of a LOADSET instruction. If it was not set, then this is a write of STOREL.

For the STOREL write interlocked, the ICU initiates a write-through operation to the memory. In case of a cache hit the block is invalidated.

For the LOADSET write interlocked, the data is written into the cache. The data is written also to the memory only if the read access of the LOADSET instruction generated a miss. This guarantees that the memory will be written only for the first time that the interlocked variable is read.

For both cases, the *MLOCK output is asserted during the memory write operation. All other caches invalidate their own copy, when a write with *MLOCK asserted is performed by another master.

There is a special way in which the processor should access interlock variables if the interlock facility is enabled (variations might be possible). The LOADSET instruction is used in order to test and set an interlock variable. If the variable value is 0, it is not busy and can be used by the processor (or the process). Note that as a result of LOADSET instruction a sub-block is loaded into the cache. This sub-block includes the interlock variable (word) and possibly some other words if the sub-block size is greater then one. The user can take advantage of this fact and place related information in the same sub-block of the interlocked variable.

If the variable value is 1, it is busy and it (or the area that it protects) cannot be used. The program can either use a busy wait scheme and continue the testing until the varialbe is free, or do other operation (or tasks) and check the variable later. The testing of the variable is done by using the LOADSET instruction.

The master ICU uses the memory address bus only for the first LOADSET instruction. The variable is read from memory and placed in the cache with the shared block status. The first write of the LOADSET is also written to the memory. The next LOADSET instructions hit in the cache (in most cases) and do not use the memory address bus. Other caches invalidate their own copy in case of a match on a write with *MLOCK asserted.

The STOREL instruction is used for the release of an interlocked variable. As a result of the STOREL instruction a write access with *MLOCK asserted is intitiated on the memory address bus by the master cache, and the variable is invalidated in all the other caches. If the variable is still in the master cache, it is also invalidated. This is done to guarantee that the next access to this variable by the processor will be a miss. The variable will be read from the memory in order to get the most up-to-date value. Note that during the usage of an interlock variable by the master cache, if another processor is trying to test the same variable at the first time (using LOADSET), the write of the LOADSET is issued on the memory address bus and variable invalidated in all other caches (including the master cache).

All the other processors that have been waiting for the variable have to access the memory when they next test it. Only the one cache that wins in the bus arbitration gets the free interlocked variable.

The main advantage of using the interlock facility is better performance and lower memory bus utilization. In a multi-processor system with many interlock variable accesses a significant performance improvement can be achieved by using it. Another advantage is that the memory controller can treat interlock accesses as regular accesses.

It should also be noted that the interlock facility can be implemented with other the n the RISC/SIP processor defined in the relevant copending application referred to herein.

What has been described herein include the novel ICU per se, along with the novel organization of the ICU for flexible cache system design, a novel cache interlock facility, a novel and flexible multiprocessor support scheme and a preload scheme for integrated cache memories. The details of the above have been set forth in terms of the novel ICU's function, its internal registers, inputs and outputs, sample instruction sets, data formats, programmability, types of systems supported, etc. In view of this presentation, those skilled in the art will readily appreciate that the objectives of the invention, set forth hereinbefore, have been met.

The foregoing description of a preferred embodiment and illustrative examples of the novel methods and apparatus has been presented for the purposes of illustration and description only. It is not intended to be exhaustive or to limit the invention to the precise form disclosed, and obviously many modifications and variations are possible in light of the above teaching.

The embodiment and examples set forth herein were presented in order to best explain the principles of the instant invention and its practical application to thereby enable others skilled in the art to best utilize the instant invention in various embodiments and with various modifications as are suited to the particular use contemplated.

It is intended that the scope of the instant invention be defined by the claims appended hereto.

What is claimed is:

1. A multiprocessing computer system comprising:
a plurality of processing units;
a system memory accessible by each of said plurality of processing units; and
a plurality of cache memory subsystems, wherein a separate cache memory subsystem is operatively coupled between a respective processing unit and said system memory, and wherein each of said cache memory subsystems is operable in a write-through write mode and a copy-back write mode, and wherein each of said plurality of cache memory subsystems includes:
a storage array containing a plurality of blocks;
a plurality of cache block status fields, wherein each of said plurality of cache block status fields corresponds to an individual block in said storage array;
a translation lookaside buffer configured to identify a page of addressed information and including a TLB write policy field associated with said page of addressed information, said TLB write policy field capable of being set in a first TLB write policy state associated with said write-through write mode and in a second TLB write policy state associated with said copy-back write mode;
one or more write policy pins capable of being placed in a first write policy pin state associated with said write-through write mode and in a second write policy pin state associated with said copy-back write mode; and a cache control unit for controlling a transfer of data when a write hit operation to a particular block in said storage array occurs, wherein said cache control unit is configured to effectuate said transfer of data in either said write-through write mode or in said copy-back write mode depending upon a state of a cache block status field corresponding to said particular block, and wherein said cache control unit is further configured such that said state of said cache block status field can be set according to at least a state of said one or more write policy pins and according to said TLB write policy field.

2. The multiprocessing computer system as recited in claim 1 wherein said cache control unit of each of said plurality of cache memory subsystems is configured to set said state of said cache block status field to indicate said write-through write mode if said one or more write policy pins are placed in said first write policy pin state, even if said TLB write policy field is set in said second TLB write policy state.

3. The multiprocessing computer system as recited in claim 1 wherein each of said plurality of cache memory subsystems further includes a write buffer coupled to said storage array wherein said write buffer is configured to store an evicted cache block prior to said evicted cache block being written back to said system memory and subsequent to said evicted cache block being removed from said storage array.

4. A multiprocessing computer system comprising:

a plurality of processing units;

a system memory accessible by each of said plurality of processing units;

a plurality of cache memory subsystems, wherein a separate cache memory subsystem is operatively coupled between a respective processing unit and said system memory, and wherein each of said cache memory subsystems is operable in a write-through write mode and a copy-back write mode, and wherein each of said plurality of cache memory subsystems includes:

a storage array containing a plurality of blocks;

a plurality of cache block status fields, wherein each of said plurality of cache block status fields corresponds to an individual block in said storage array;

a translation lookaside buffer configured to identify a page of addressed information and including a TLB write policy field associated with said page of addressed information, said TLB write policy field capable of being set in a first TLB write policy state associated with said write-through write mode and in a second TLB write policy state associated with said copy-back write mode;

one or more write policy pins capable of being placed in a first write policy pin state associated with said write-through write mode and in a second write policy pin state associated with said copy-back write mode; and a cache control unit configured to accommodate a setting of a state of a cache block status field corresponding to a particular block of said storage array depending upon a state of said one or more write policy pins and depending upon said TLB write policy field, and wherein said cache control unit is further configured to subsequently effectuate a transfer of data in either said write-through write mode or in said copy-back write mode dependent upon said state of said cache block status field.

5. The multiprocessing computer system as recited in claim 4 wherein said cache control unit of each of said plurality of cache memory subsystems is configured to effectuate said transfer of said addressed data in response to an occurrence of a write hit to said particular block of said storage array.

6. The multiprocessing computer system as recited in claim 4 wherein said cache control unit of each of said plurality of cache memory subsystems is configured to set said state of said cache block status field to indicate said write-through write mode if said one or more write policy pins are placed in said first write policy pin state, even if said TLB write policy field is set in said second TLB write policy state.

7. The multiprocessing computer system as recited in claim 4 further comprising a write buffer coupled to said storage array wherein said write buffer is configured to store an evicted cache block prior to said evicted cache block being written back to said system memory and subsequent to said evicted cache block being removed from said storage array.

* * * * *